US012659794B2

(12) United States Patent
Kim et al.

(10) Patent No.: US 12,659,794 B2
(45) Date of Patent: Jun. 16, 2026

(54) METHOD AND APPARATUS FOR TRANSMITTING BSR INFORMATION FOR ANOTHER LINK ON BASIS OF A-CONTROL FIELD IN WIRELESS LAN SYSTEM

(71) Applicant: LG ELECTRONICS INC., Seoul (KR)

(72) Inventors: Namyeong Kim, Seoul (KR); Jeongki Kim, Seoul (KR); Jinsoo Choi, Seoul (KR); Insun Jang, Seoul (KR); Sunhee Baek, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 349 days.

(21) Appl. No.: 18/276,820

(22) PCT Filed: Feb. 7, 2022

(86) PCT No.: PCT/KR2022/001842
§ 371 (c)(1),
(2) Date: Aug. 10, 2023

(87) PCT Pub. No.: WO2022/173177
PCT Pub. Date: Aug. 18, 2022

(65) Prior Publication Data
US 2024/0107371 A1      Mar. 28, 2024

(30) Foreign Application Priority Data

Feb. 10, 2021    (KR) ........................ 10-2021-0019504

(51) Int. Cl.
*H04W 28/02* (2009.01)
*H04W 76/11* (2018.01)
(Continued)

(52) U.S. Cl.
CPC .................. *H04W 28/0278* (2013.01); *H04W 28/0221* (2013.01); *H04W 76/11* (2018.02); *H04W 76/15* (2018.02); *H04W 84/12* (2013.01)

(58) Field of Classification Search
CPC ......... H04W 28/0278; H04W 28/0221; H04W 76/11; H04W 76/15; H04W 84/12;
(Continued)

(56) References Cited

U.S. PATENT DOCUMENTS

| | | | |
|---|---|---|---|
| 2019/0045438 A1* | 2/2019 | Cariou | H04W 52/0229 |
| 2019/0246312 A1* | 8/2019 | Kim | H04W 52/365 |
| 2021/0136605 A1* | 5/2021 | Huang | H04W 24/10 |
| 2022/0217731 A1* | 7/2022 | Wang | H04W 72/121 |

FOREIGN PATENT DOCUMENTS

| | | |
|---|---|---|
| EP | 4114076 | 1/2023 |
| WO | 2021002618 | 1/2021 |

(Continued)

OTHER PUBLICATIONS

European Patent Office Application Serial No. 22752937.7, Search Report dated Dec. 5, 2024, 10 pages.
(Continued)

*Primary Examiner* — Kibrom T Hailu
(74) *Attorney, Agent, or Firm* — LEE, HONG, DEGERMAN, KANG & WAIMEY

(57) ABSTRACT
Proposed are a method and apparatus for transmitting BSR information for another link on the basis of an A-control field in a wireless LAN system. In particular, a reception MLD generates an A-control field, and transmits the A-control field to a transmission MLD via a first link. The transmission MLD includes: a first transmission STA operating in the first link; a second transmission STA operating in a second link; and a third transmission STA operating in a third link. The reception MLD includes: a first reception STA operating in the first link; a second reception STA
(Continued)

operating in the second link; and a third reception STA operating in the third link. The A-control field includes a control identifier, and control information for a BSR.

15 Claims, 36 Drawing Sheets

(51) Int. Cl.
    *H04W 76/15*         (2018.01)
    *H04W 84/12*         (2009.01)

(58) Field of Classification Search
    CPC ...... H04W 72/21; H04W 28/06; H04L 69/14;
                                 Y02D 30/70
    See application file for complete search history.

(56)                    References Cited

FOREIGN PATENT DOCUMENTS

| WO | 2021003181 | 1/2021 |
| WO | 2021011476 | 1/2021 |

OTHER PUBLICATIONS

PCT International Application No. PCT/KR2022/001842, International Search Report dated May 3, 2022, 3 pages.
Huawei, "BSR Fast Report in BA Frame," IEEE 802.11-20/1686-01-00be, Oct. 2020, 14 pages.

* cited by examiner (a)

Figure 4:
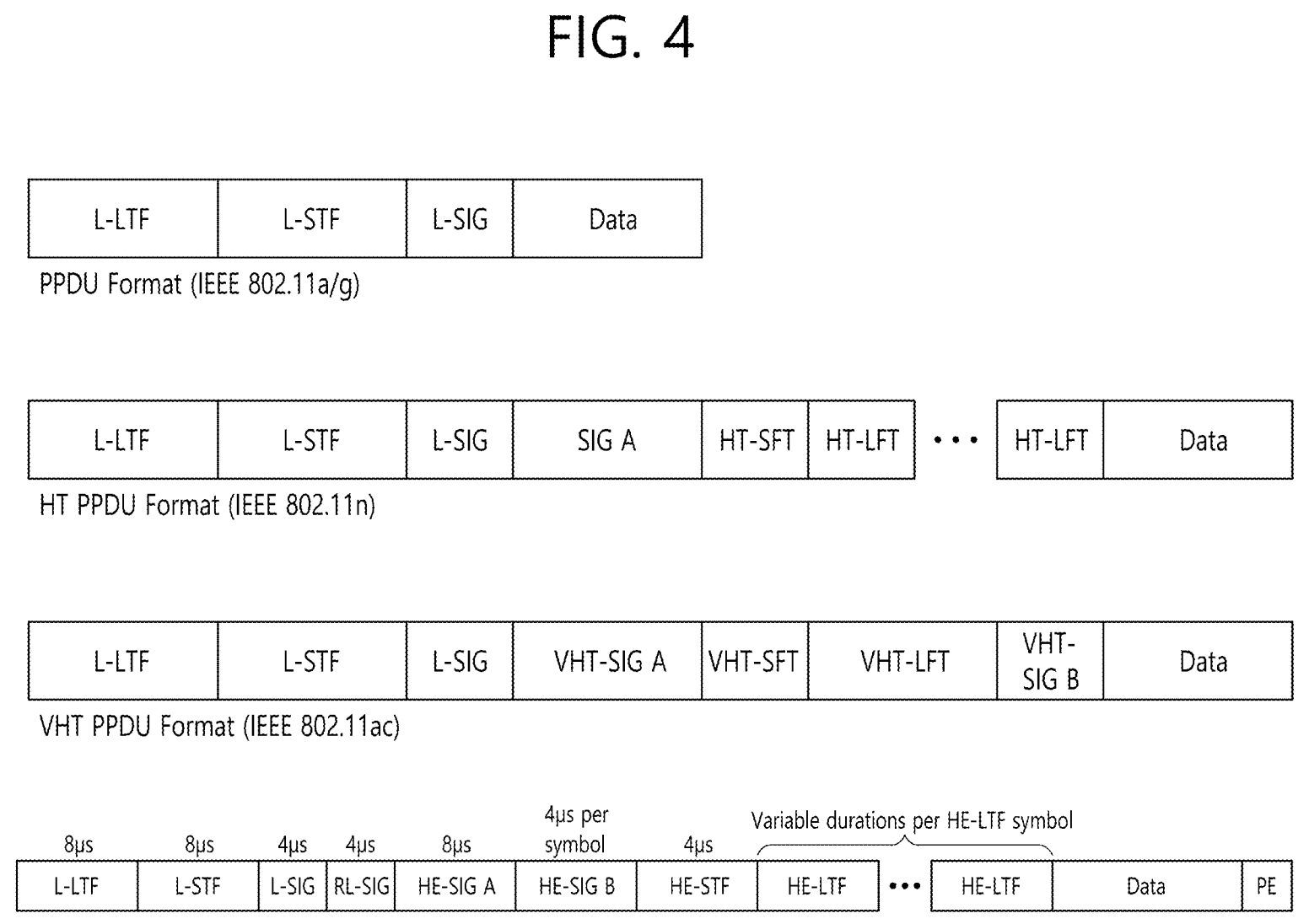

| L-LTF | L-STF | L-SIG | Data |
|---|---|---|---|

PPDU Format (IEEE 802.11a/g)

| L-LTF | L-STF | L-SIG | SIG A | HT-SFT | HT-LFT | ... | HT-LFT | Data |
|---|---|---|---|---|---|---|---|---|

HT PPDU Format (IEEE 802.11n)

| L-LTF | L-STF | L-SIG | VHT-SIG A | VHT-SFT | VHT-LFT | VHT-SIG B | Data |
|---|---|---|---|---|---|---|---|

VHT PPDU Format (IEEE 802.11ac)

| 8μs | 8μs | 4μs | 4μs | 8μs | 4μs per symbol | 4μs | | | | | |
|---|---|---|---|---|---|---|---|---|---|---|---|
| L-LTF | L-STF | L-SIG | RL-SIG | HE-SIG A | HE-SIG B | HE-STF | HE-LTF | ... | HE-LTF | Data | PE |

Variable durations per HE-LTF symbol

| 1210 | 1220 | 1230 | 1240 | 1250 | 1260 |
|---|---|---|---|---|---|
| Length | cascade indication | CS required | HE-SIG-A info | CP and LTF type | Trigger Type |
| 12 | 1 | 1 | TBD | TBD | TBD |

Bits :

FIG. 10

| L-STF | L-LTF | L-SIG | RL-SIG | U-SIG | EHT-SIG | EHT-STF | EHT-LTF | Data |

FIG. 12

| Multi-link STA | | |
|---|---|---|
| 5GHz | 6GHz | |
| STA 1<br>Link 1 | STA 2<br>Link 2 | STA 3<br>Link 3 |

FIG. 20

| Control ID | Link ID | Control Information | ⋯ |
|---|---|---|---|

FIG. 24

| Control ID | Link ID 1 | Control Information | Link ID 2 | Control Information | • • • |
|------------|-----------|---------------------|-----------|---------------------|-------|
| 4bit | 4bit | variable | 4bit | variable | |

FIG. 28

| Control ID | Control Information per Link |

FIG. 29

| Link ID | ACI Bitmap | Delta TID | ACI High | Scaling Factor | Queue Size High | Queue Size All |
|---------|-----------|-----------|----------|----------------|-----------------|----------------|

| B0 | B3 B4 | B5 B6 | B7 B8 | B10 | B10 B10 B18 | B18 B25 |
|---|---|---|---|---|---|---|
| ACI Bitmap | Delta TID | ACI High | Scaling Factor | | Queue Size High | Queue Size All |
| 4 | 2 | 2 | 2 | | 8 | 8 |

Bits:

FIG. 32

| Link ID | ACI Bitmap | Delta TID | ACI High | Scaling Factor | Queue Size High |
|---------|-----------|-----------|----------|----------------|-----------------|
| 4bit | 4bit | 2bit | 2bit | 2bit | 8bit |

FIG. 33

| Link ID | ACI Bitmap | Delta TID | Scaling Factor | Queue Size All |
|---------|-----------|-----------|----------------|----------------|
| 4bit | 4bit | 2bit | 2bit | 8bit | generating, by a receiving multi-link device (MLD), an A-Control field ⌐ S3610 transmitting, by the receiving MLD, the A-Control field to a transmitting MLD through a first link ⌐ S3620

METHOD AND APPARATUS FOR TRANSMITTING BSR INFORMATION FOR ANOTHER LINK ON BASIS OF A-CONTROL FIELD IN WIRELESS LAN SYSTEM

CROSS-REFERENCE TO RELATED APPLICATION(S)

This application is the National Stage filing under 35 U.S.C. 371 of International Application No. PCT/KR2022/001842, filed on Feb. 7, 2022, which claims the benefit of earlier filing date and right of priority to Korean Application No. 10-2021-0019504, filed on Feb. 10, 2021, the contents of which are all incorporated by reference herein in their entirety.

TECHNICAL FIELD

The present specification relates to a multi-link operation in a wireless LAN system, and more particularly, to a method and apparatus for transmitting BSR information for another link based on an A-Control field.

BACKGROUND

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for transmitting BSR information for another link based on an A-Control field in a wireless LAN system.

An example of this specification proposes a method for transmitting BSR information for another link based on the A-Control field.

The present embodiment may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment newly defines the existing A-Control field to support Multi-Link, and propose a method and apparatus for transmitting and receiving BSR information of another link (or other receiving STA) based on the newly defined A-Control field. Here, the transmitting MLD may correspond to the AP MLD, and the receiving MLD may correspond to the non-AP MLD.

A receiving multi-link device (MLD) generates an A-Control field.

The receiving MLD transmits the A-Control field to a transmitting MLD through a first link.

The transmitting MLD includes a first transmitting station (STA) operating on the first link, a second transmitting STA operating on a second link, and a third transmitting STA operating on a third link.

The receiving MLD includes a first receiving STA operating on the first link, a second receiving STA operating on the second link, and a third receiving STA operating on the third link.

The A-Control field includes a control identifier and control information for a Buffer Status Report (BSR). The control information for the BSR may be set based on the control identifier. A value of the control identifier may be 3. The A-Control field is composed of the control identifier and control information according to the control identifier. When the value of the control identifier is 3, the control information may be set as control information for the BSR.

The control information for the BSR includes a link identifier, an Access Category Index (ACI) bitmap subfield, a Delta Traffic Identifier (TID) subfield, an ACI High subfield, a Scaling Factor subfield, and a Queue Size High subfield.

Control information for a BSR supporting one existing link includes the ACI bitmap subfield, the Delta TID subfield, the ACI High subfield, the scaling factor subfield, the Queue Size High subfield, and the Queue Size All subfield. The ACI bitmap subfield is 4 bits, the Delta TID subfield is 2 bits, the ACI High subfield is 2 bits, the scaling factor subfield is 2 bits, the Queue Size High subfield is 8 bits, and the Queue Size All subfield is 8 bits. That is, the control information for the existing BSR consists of a total of 26 bits.

When the A-Control field defined in the 802.11ax wireless LAN system includes a control identifier and control information for BSR (supporting one link), since the control identifier is 4 bits and the control information for the existing BSR is 26 bits, it is assumed that the A-Control field must be configured within 30 bits.

However, as in this embodiment, when the link identifier is included in the control information for the BSR to configure the control information for the BSR supporting Multi-Link, since the link identifier is 4 bits, there may be a problem that the size of the A-Control field exceeds 30 bits. Accordingly, in order to include control information for the BSR supporting Multi-Link using the existing A-Control field, a format that is lighter than the control information for the existing BSR is required. This embodiment proposes a method for transmitting and receiving BSR information for another receiving STA in a receiving MLD (non-AP MLD) in one frame (the A-Control field) by omitting some subfields (Queue Size All subfields to be described later) in the control information for the existing BSR to configure the control information of the A-Control field.

According to the embodiment proposed in this specification, frame overhead can be reduced by transmitting and receiving BSR information (or control information) for several links in one frame. Even if the link of another STA is not in an awake state, it is possible to transmit BSR information of the other STA using the link of a specific STA, which is effective in terms of power saving.

BRIEF DESCRIPTION OF THE DRAWINGS

FIG. 4 illustrates an example of a PPDU used in an IEEE standard.

FIG. 10 illustrates an example of a PPDU used in the present specification.

FIG. 12 shows an example of a structure of a non-AP MLD.

FIG. 20 shows an example of a Multi-link Control subfield format for indicating multi-link.

FIG. 24 shows an example of a Control List subfield including different Control Information for each link.

FIG. 28 shows an example of a BSR Control subfield for indicating multi-link.

FIG. 29 shows an example of a BSR Control Information subfield for indicating Multi-Link.

FIG. 32 shows an example of the Control Information subfield of the A-Control field for requesting BSR information of MLD.

FIG. 33 shows another example of the Control Information subfield of the A-Control field for requesting BSR information of MLD.

DETAILED DESCRIPTION

Figure 1:
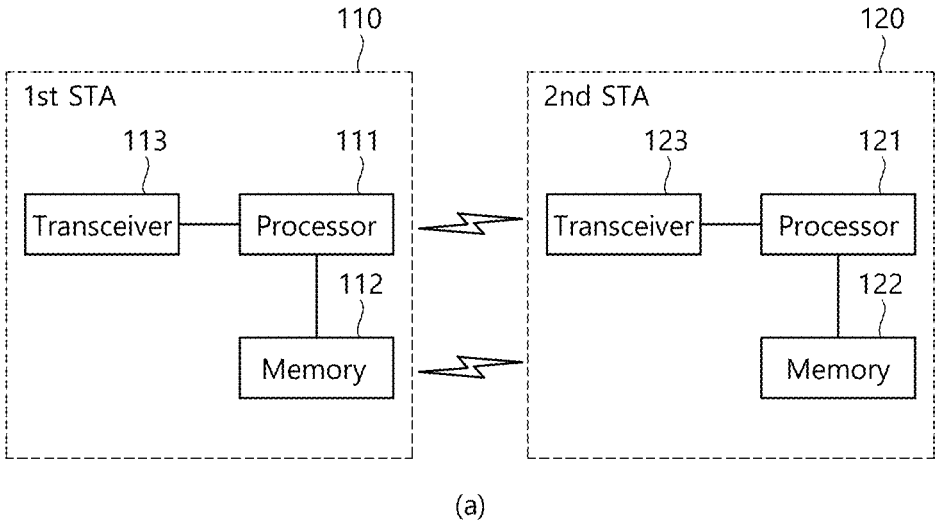
FIG. 1 shows an example of a transmitting apparatus and/or receiving apparatus of the present specification.
Figure 1:
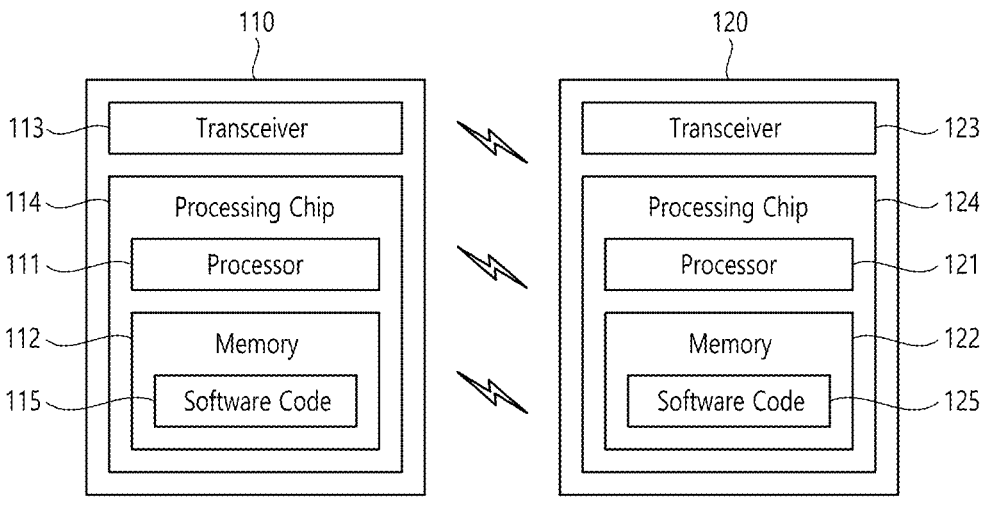

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may denote that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a $3^{rd}$ generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

The STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP', the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

Figure 2:
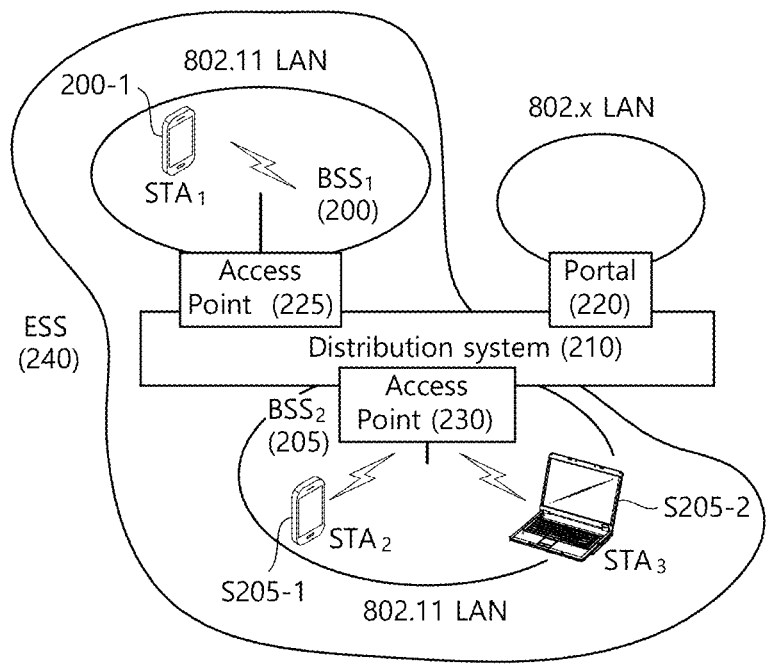
FIG. 2 is a conceptual view illustrating the structure of a wireless local area network (WLAN).
Figure 2:
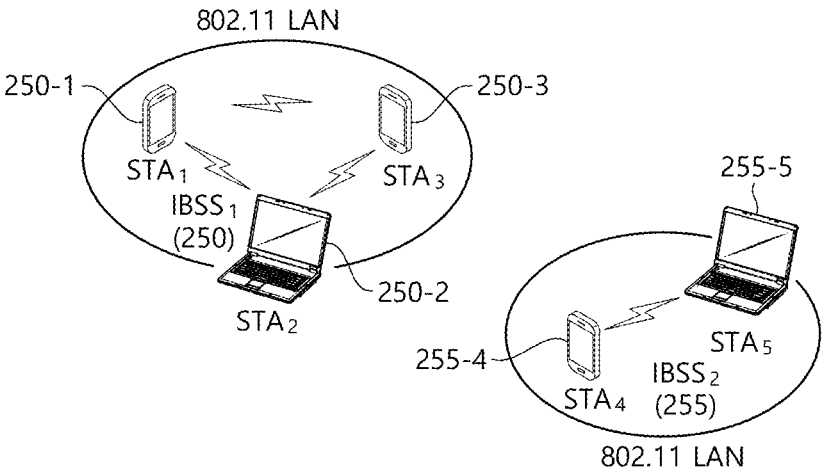

FIG. 2 is a conceptual view illustrating the structure of a wireless local area network (WLAN).

An upper part of FIG. 2 illustrates the structure of an infrastructure basic service set (BSS) of institute of electrical and electronic engineers (IEEE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (S SID).

A portal 220 may serve as a bridge which connects the wireless LAN network (IEEE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

Figure 3:
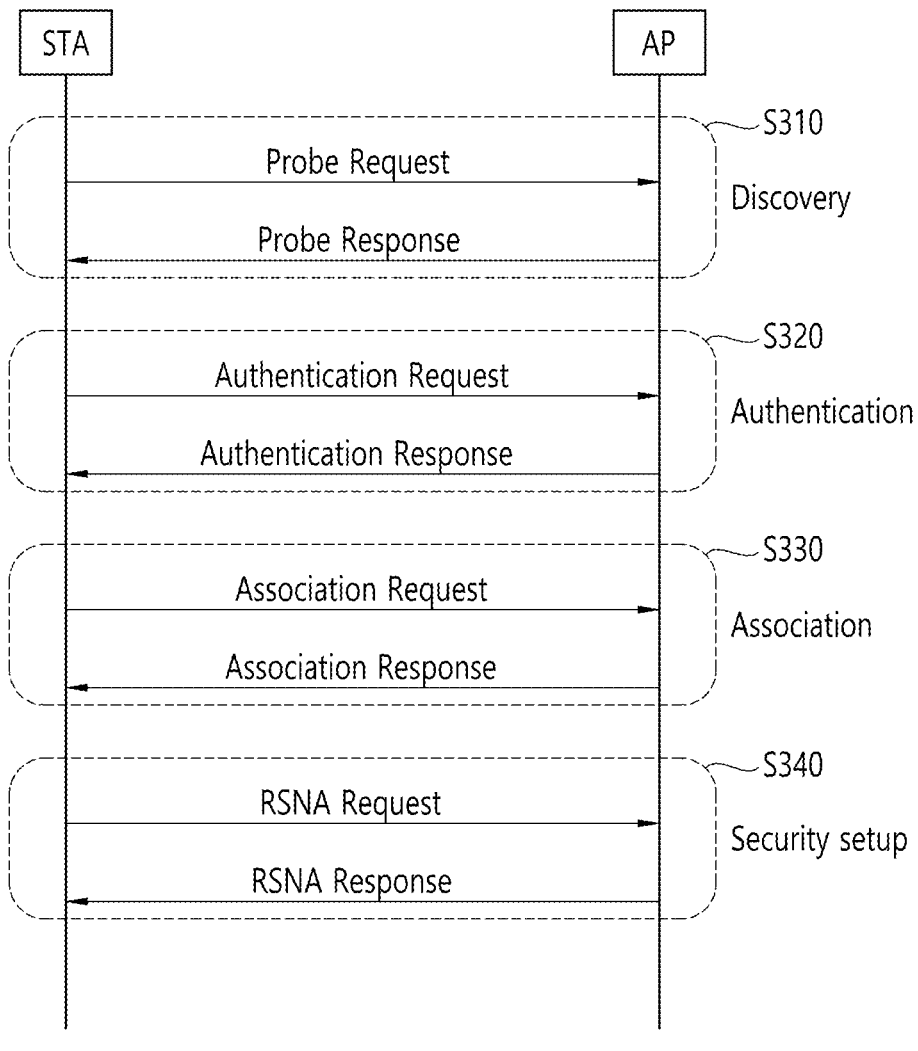
FIG. 3 illustrates a general link setup process.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information related to a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information related to an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information related to various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information related to various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., an AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same (or overlapped) time period.

For example, when a DL MU PPDU is configured, the transmitting STA (e.g., AP) may allocate the first RU (e.g., 26/52/106/242-RU, etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
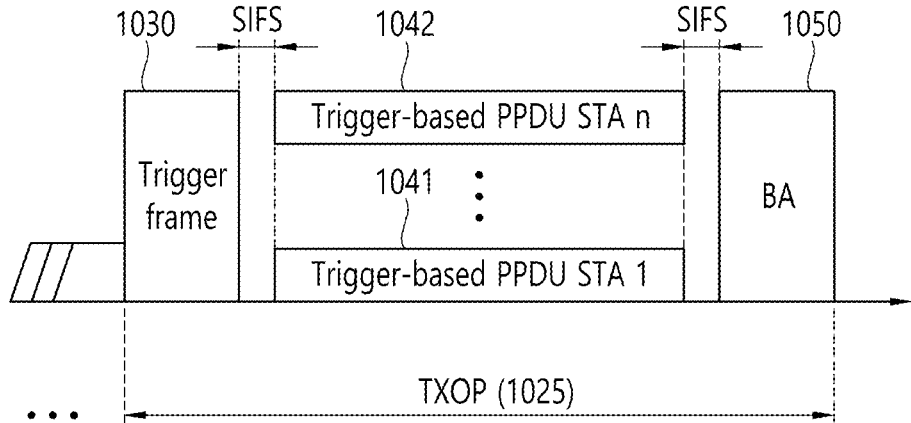
FIG. 5 illustrates an operation based on UL-MU.

FIG. 5 illustrates an operation based on UL-MU. As illustrated, a transmitting STA (e.g., an AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
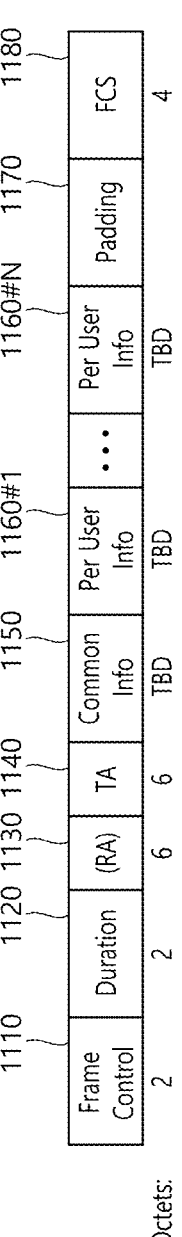
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of a STA.

In addition, an RA field 1130 may include address information of a receiving STA of a corresponding trigger frame, and may be optionally omitted. A TA field 1140 may include address information of a STA (e.g., an AP) which transmits the corresponding trigger frame.

A common information field 1150 includes common control information applied to the receiving STA which receives the corresponding trigger frame. For example, a field indicating a length of an L-SIG field of an uplink PPDU transmitted in response to the corresponding trigger frame or information for controlling content of a SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180. Each of the per user information fields 1160 #1 to 1160 #N shown in FIG. 6 may include a plurality of subfields.

Figure 7:
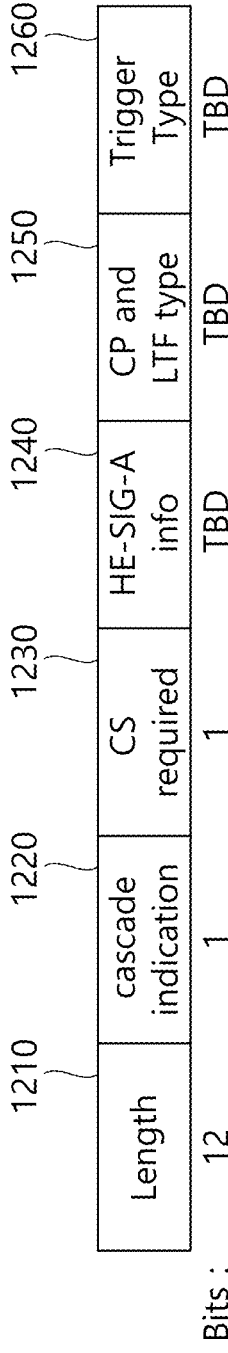
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or a NAV or the like is necessarily considered in a situation where a receiving device which has received a corresponding trigger frame transmits a corresponding uplink PPDU.

An HE-SIG-A information field 1240 may include information for controlling content of a SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
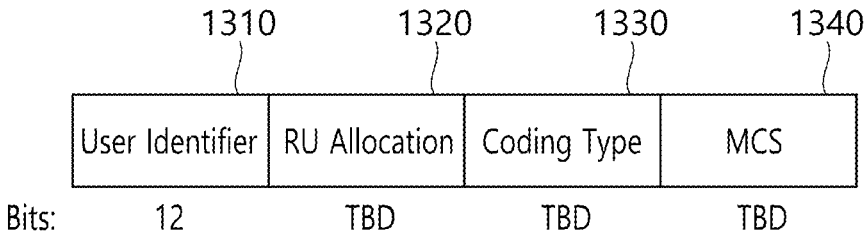
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of a STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
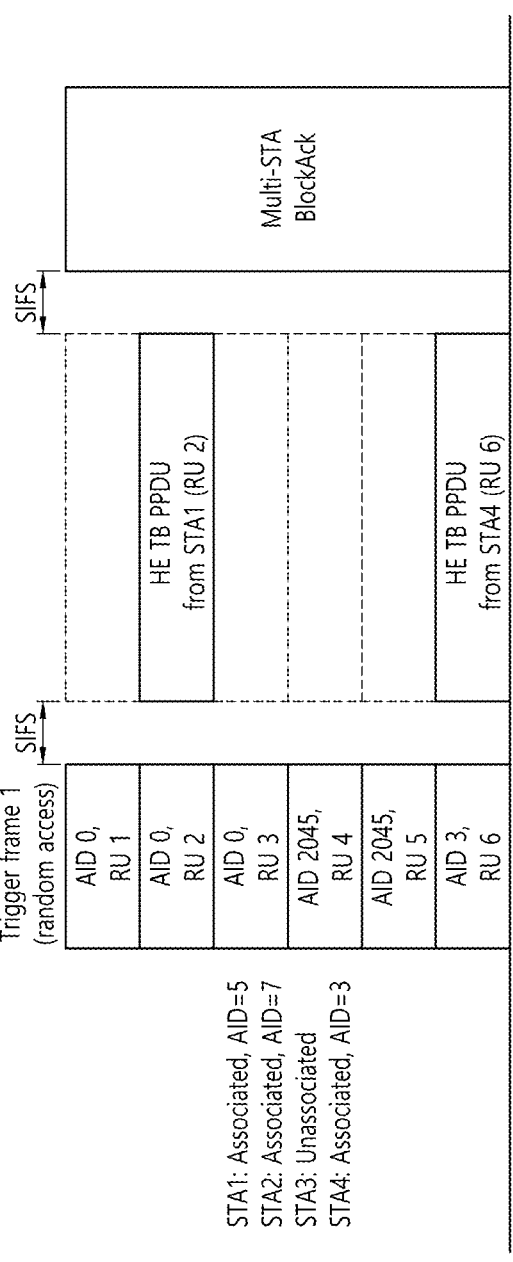
FIG. 9 describes a technical feature of the UORA scheme.

FIG. 9 describes a technical feature of the UORA scheme.

A transmitting STA (e.g., an AP) may allocate six RU resources through a trigger frame as shown in FIG. 9. Specifically, the AP may allocate a 1st RU resource (AID 0, RU 1), a 2nd RU resource (AID 0, RU 2), a 3rd RU resource (AID 0, RU 3), a 4th RU resource (AID 2045, RU 4), a 5th RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the 1st to 3rd RU resources of FIG. 9 may be used as a UORA resource for the associated STA, the 4th and 5th RU resources of FIG. 9 may be used as a UORA resource for the un-associated STA, and the 6th RU resource of FIG. 9 may be used as a typical resource for UL MU.

In the example of FIG. 9, an OFDMA random access backoff (OBO) of a STA1 is decreased to 0, and the STA1 randomly selects the 2nd RU resource (AID 0, RU 2). In addition, since an OBO counter of a STA2/3 is greater than 0, an uplink resource is not allocated to the STA2/3. In addition, regarding a STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU

4, RU 5), and thus the STA3 decreases the OBO counter by 2 but the OBO counter is greater than 0.

Hereinafter, a PPDU transmitted/received in a STA of the present specification will be described.

Figure 10:
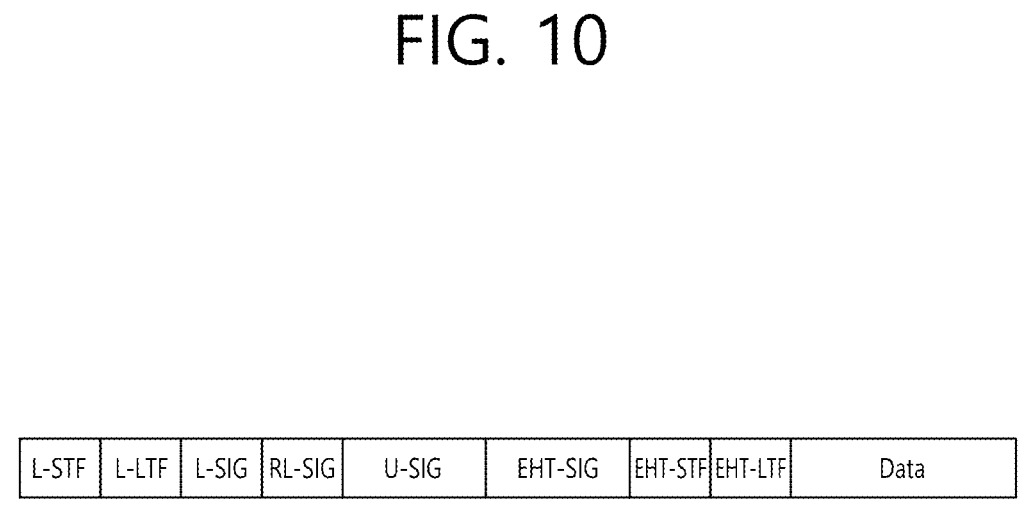

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a ½ coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier {subcarrier index 0}. As a result, the 48 BPSK symbols may be mapped to subcarrier indices −26 to −22, −20 to −8, −6 to −1, +1 to +6, +8 to +20, and +22 to +26.

The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 μs. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=½ to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG; 5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frames, the management frame, and the data frame.

Figure 11:
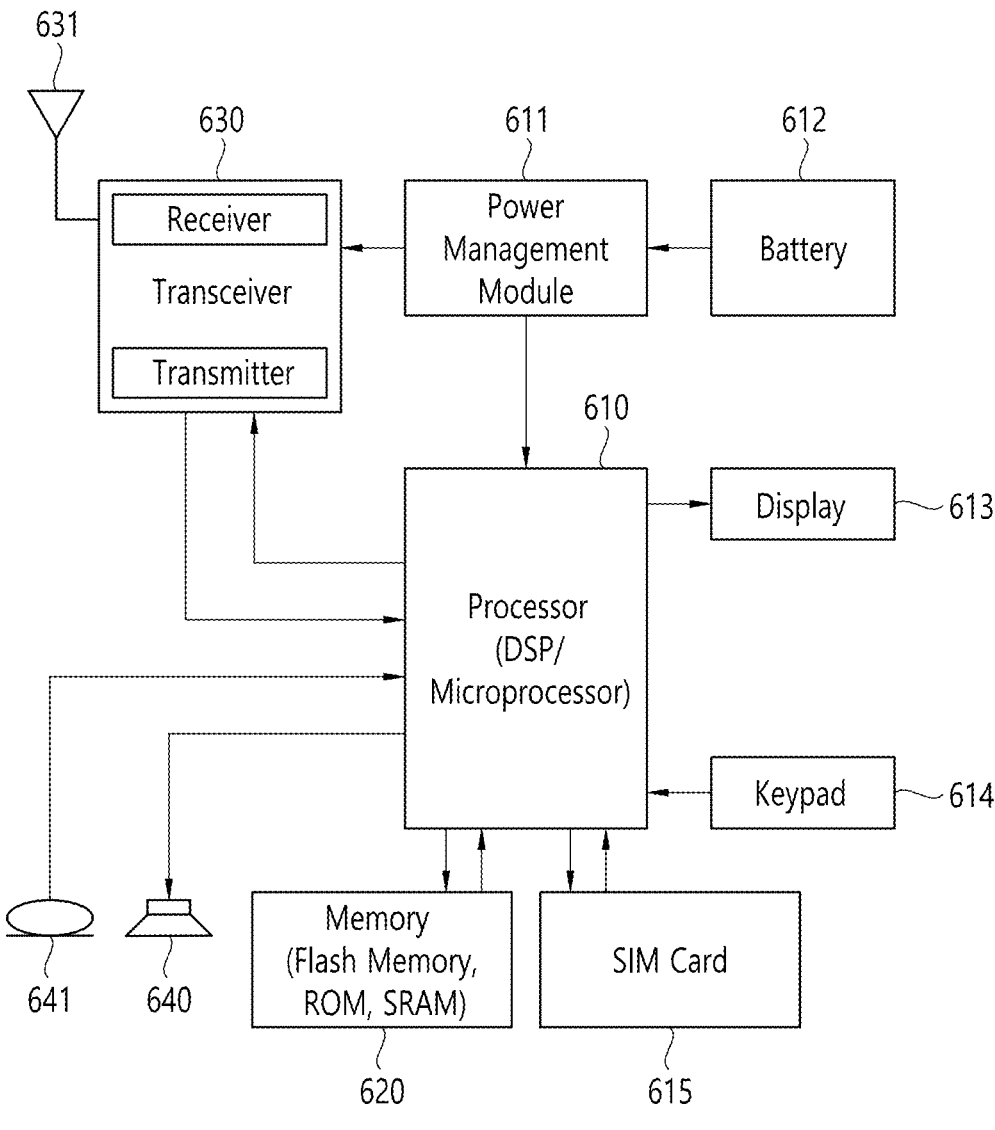
FIG. 11 illustrates an example of a modified transmission device and/or receiving device of the present specification.

FIG. 11 illustrates an example of a modified transmission device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, technical features of multi-link (ML) supported by the STA of the present specification will be described.

STAs (AP and/or non-AP STA) of the present specification may support multi-link (ML) communication. ML communication may mean communication supporting a plurality of links. Links related to ML communication may include channels (e.g., 20/40/80/160/240/320 MHz channels) of the 2.4 GHz band, the 5 GHz band, and the 6 GHz band.

A plurality of links used for ML communication may be set in various ways. For example, a plurality of links supported by one STA for ML communication may be a plurality of channels in the 2.4 GHz band, a plurality of channels in the 5 GHz band, and a plurality of channels in the 6 GHz band. Alternatively, a plurality of links may be a combination of at least one channel within the 2.4 GHz band (or 5 GHz/6 GHz band) and at least one channel within the 5 GHz band (or 2.4 GHz/6 GHz band). Meanwhile, at least one of a plurality of links supported by one STA for ML communication may be a channel to which preamble puncturing is applied.

The STA may perform ML setup to perform ML communication. ML setup may be performed based on management frames or control frames such as Beacon, Probe Request/Response, and Association Request/Response. For example, information on ML setup may be included in element fields included in Beacon, Probe Request/Response, and Association Request/Response.

When ML setup is completed, an enabled link for ML communication may be determined. The STA may perform frame exchange through at least one of a plurality of links determined as an enabled link. For example, an enabled link may be used for at least one of a management frame, a control frame, and a data frame.

When one STA supports a plurality of Links, a transmitting/receiving device supporting each Link may operate like one logical STA. For example, one STA supporting two links may be expressed as one ML device (Multi Link Device; MLD) including a first STA for a first link and a second STA for a second link. For example, one AP supporting two links may be expressed as one AP MLD including a first AP for a first link and a second AP for a second link. In addition, one non-AP supporting two links may be expressed as one non-AP MLD including a first STA for the first link and a second STA for the second link.

More specific features of the ML setup are described below.

An MLD (AP MLD and/or non-AP MLD) may transmit information about a link that the corresponding MLD can support through ML setup. Link-related information may be configured in various ways. For example, link-related information includes at least one of 1) information on whether the MLD (or STA) supports simultaneous RX/TX operation, 2) information on the number/upper limit of uplink/downlink links supported by the MLD (or STA), 3) information on the location/band/resource of uplink/downlink link supported by MLD (or STA), 4) type of frame available or preferred in at least one uplink/downlink link (management, control, data etc.), 5) available or preferred ACK policy information on at least one uplink/downlink link, and 6) information on available or preferred TID (traffic identifier) on at least one uplink/downlink link. The TID is related to the priority of traffic data and is represented by 8 types of values according to the conventional wireless LAN standard. That is, 8 TID values corresponding to 4 access categories (AC) (AC_BK (background), AC_BE (best effort), AC_VI (video), AC_VO (voice)) according to the conventional wireless LAN standard may be defined.

For example, it may be set in advance that all TIDs are mapped for uplink/downlink links. Specifically, if negotiation is not done through ML setup, all TIDs may be used for ML communication, and if mapping between uplink/downlink links and TIDs is negotiated through additional ML setup, the negotiated TIDs may be used for ML communication.

A plurality of links that can be used by the transmitting MLD and the receiving MLD related to ML communication can be set through ML setup, and this can be called an enabled link. The enabled link can be called differently in a variety of ways. For example, it may be called various expressions such as a first link, a second link, a transmitting link, and a receiving link.

After the ML setup is complete, the MLD may update the ML setup. For example, the MLD may transmit information about a new link when updating information about a link is required. Information about the new link may be transmitted based on at least one of a management frame, a control frame, and a data frame.

The device described below may be the apparatus of FIGS. 1 and/or 11, and the PPDU may be the PPDU of FIG. 10. A device may be an AP or a non-AP STA. A device described below may be an AP multi-link device (MLD) or a non-AP STA MLD supporting multi-link.

In EHT (extremely high throughput), a standard being discussed after 802.11ax, a multi-link environment in which one or more bands are simultaneously used is considered. When a device supports multi-link, the device can simultaneously or alternately use one or more bands (e.g., 2.4 GHz, 5 GHz, 6 GHz, 60 GHz, etc.).

In the following specification, MLD means a multi-link device. The MLD has one or more connected STAs and has one MAC service access point (SAP) that communicates with the upper link layer (Logical Link Control, LLC). MLD may mean a physical device or a logical device. Hereinafter, a device may mean an MLD.

In the following specification, a transmitting device and a receiving device may mean MLD. The first link of the receiving/transmitting device may be a terminal (e.g., STA or AP) included in the receiving/transmitting device and performing signal transmission/reception through the first link. The second link of the receiving/transmitting device may be a terminal (e.g., STA or AP) that transmits/receives a signal through the second link included in the receiving/transmitting device.

In IEEE802.11be, two types of multi-link operations can be supported. For example, simultaneous transmit and receive (STR) and non-STR operations may be considered. For example, STR may be referred to as asynchronous multi-link operation, and non-STR may be referred to as synchronous multi-link operation. Multi-links may include multi-bands. That is, multi-links may mean links included in several frequency bands or may mean multiple links included in one frequency band.

EHT (11be) considers multi-link technology, where multi-link may include multi-band. That is, multi-link can represent links of several bands and multiple multi-links within one band at the same time. Two major multi-link operations are being considered. Asynchronous operation, which enables TX/RX simultaneously on several links, and synchronous operation, which is not possible, are being considered. Hereinafter, a capability that enables simultaneous reception and transmission on multiple links is referred to as STR (simultaneous transmit and receive), an STA having STR capability is referred to as STR MLD (multi-link device), and an STA that does not have STR capability is referred to as a non-STR MLD.

In the following specification, for convenience of explanation, it is described that the MLD (or the processor of the MLD) controls at least one STA, but is not limited thereto. As described above, the at least one STA may transmit and receive signals independently regardless of MLD.

According to an embodiment, an AP MLD or a non-AP MLD may have a structure having a plurality of links. In other words, a non-AP MLD can support multiple links. A non-AP MLD may include a plurality of STAs. A plurality of STAs may have Link for each STA.

In the EHT standard (802.11be standard), the MLD (Multi-Link Device) structure in which one AP/non-AP MLD supports multiple links is considered as a major technology. STAs included in the non-AP MLD may transmit information about other STAs in the non-AP MLD together through one link. Accordingly, there is an effect of reducing the overhead of frame exchange. In addition, there is an effect of increasing the link use efficiency of the STA and reducing power consumption.

FIG. 12 shows an example of a structure of a non-AP MLD.

Referring to FIG. 12, a non-AP MLD may be configured with a plurality of links. In other words, a non-AP MLD can support multiple links. A non-AP MLD may include a plurality of STAs. A plurality of STAs may have Link for each STA. Although FIG. 12 shows an example of a non-AP MLD structure, the structure of the AP MLD may also be configured identically to the example of the structure of the non-AP MLD shown in FIG. 12.

For example, the non-AP MLD may include STA 1, STA 2, and STA 3. STA 1 can operate on link 1. link 1 may be included in the 5 GHz band. STA 2 can operate on link 2. link 2 may be included in the 6 GHz band. STA 3 can operate on link 3. link 3 may be included in the 6 GHz band. Bands included in link 1/2/3 are exemplary and may be included in 2.4, 5, and 6 GHz.

As such, in the case of an AP/non-AP MLD supporting multi-link, each AP of the AP MLD and each STA of the non-AP MLD may be connected to each link through a link setup process. And at this time, the connected link can be changed or reconnected to another link by AP MLD or non-AP MLD depending on the situation.

In addition, in the EHT standard, a link may be classified as an anchored link or a non-anchored link in order to reduce power consumption. An anchored link or non-anchored link can be called variously. For example, an anchored link may be referred to as a primary link. A non-Anchored Link can be called a Secondary link.

According to an embodiment, an AP MLD supporting multi-link can be managed by designating each link as an anchored link or a non-anchored link. The AP MLD may support one or more links among a plurality of links as an anchored link. A non-AP MLD can use it by selecting one or more of its own anchored links from the Anchored Link List (list of anchored links supported by the AP MLD).

For example, Anchored Link can be used for non-data frame exchange (i.e. Beacon and Management frame) as well as frame exchange for synchronization. Also, non-anchored links can only be used for data frame exchange.

The non-AP MLD can monitor only the anchored link for receiving beacons and management frames during the idle period. Therefore, in the case of non-AP MLD, at least one anchored link must be connected to receive beacon and management frame. The one or more Anchored Links must always maintain an enable state. In contrast, non-anchored links are used only for data frame exchange. Accordingly, an STA corresponding to a non-anchored link (or an STA connected to a non-anchored link) may enter doze during an idle period not using a channel/link. This has the effect of reducing power consumption.

Therefore, in the following specification, a protocol for recommending or requesting link reconnection by an AP MLD or a non-AP MLD dynamically according to circumstances may be proposed for efficient link connection. In addition, in the following specification, an anchored link reconnection protocol considering characteristics of an anchored link used for the purpose of power reduction as well as a general link may be additionally proposed.

Example for Link Change and Reconnection

According to an embodiment, each link between an AP MLD and a non-AP MLD may be determined in an Association or (re)Association process. At this time, the AP MLD and the non-AP MLD can perform frame exchange through the connected Link. A specific embodiment in which an AP MLD and a non-AP MLD are connected through a link setup process can be described with reference to FIG. 13.

Figure 13:
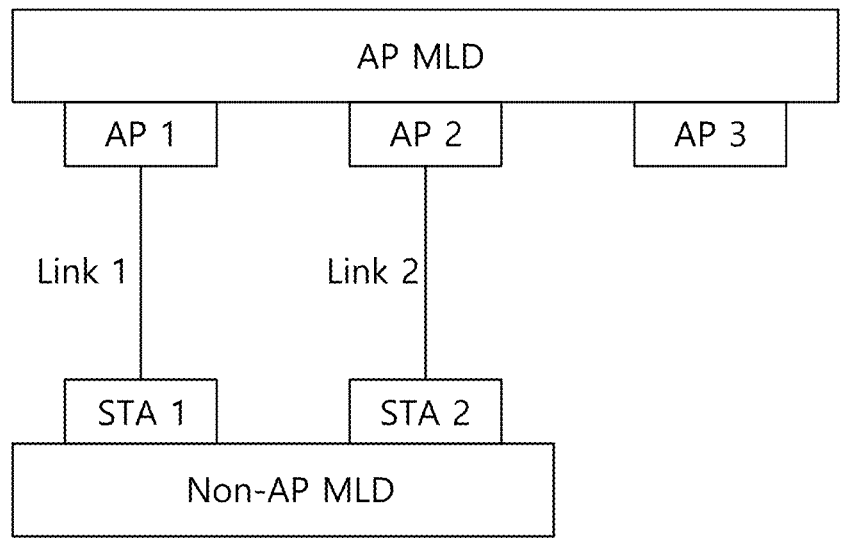
FIG. 13 illustrates an example in which an AP MLD and anon-AP MLD are connected through a link setup process.

FIG. 13 illustrates an example in which an AP MLD and a non-AP MLD are connected through a link setup process.

Referring to FIG. 13, the AP MLD may include AP 1, AP 2, and AP 3. The non-AP MLD may include STA 1 and STA 2. AP 1 and STA 1 may be connected through link 1. AP 2 and STA 2 may be connected through link 2.

For example, AP 1 and STA 1 may be connected through link 1 through a first link setup process. AP 2 and STA 2 may be connected through link 2 through a second link setup process. For another example, AP MLD and non-AP MLD may be connected through a one-time link setup process. In other words, the AP MLD and the non-AP MLD may be connected through link 1 and link 2 based on a link setup process once.

As described above, each AP and STA may perform frame exchange through the connected Link. In addition, information of other APs on a different link or other STAs on a different link may be transmitted and received through one link.

However, after this link setup process, the AP MLD or non-AP MLD may request link change or reconnection for more efficient frame exchange (e.g., load balancing or interference avoiding, etc.) depending on the situation/environment.

An embodiment of link change or reconnection may be described with reference to FIG. 14.

Figure 14:
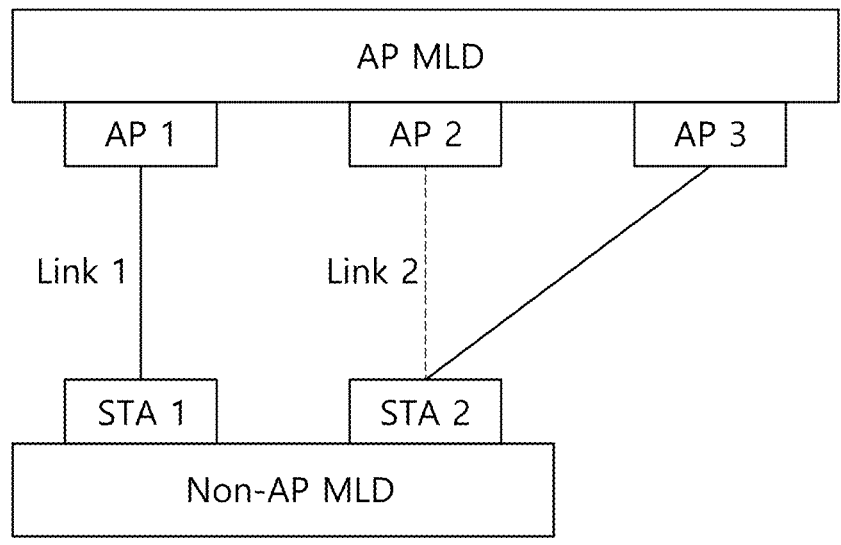
FIG. 14 illustrates an example in which Link is changed or reconnected.

FIG. 14 illustrates an example in which Link is changed or reconnected.

Referring to FIG. 14, conventionally, STA 2 is connected to AP 2. Thereafter, data load of AP 2 may be excessive. STA 2 may be reconnected to AP 3 having a relatively small data load. In this case, there is an effect that the AP MLD and the non-AP MLD can perform efficient data exchange.

Figure 15:
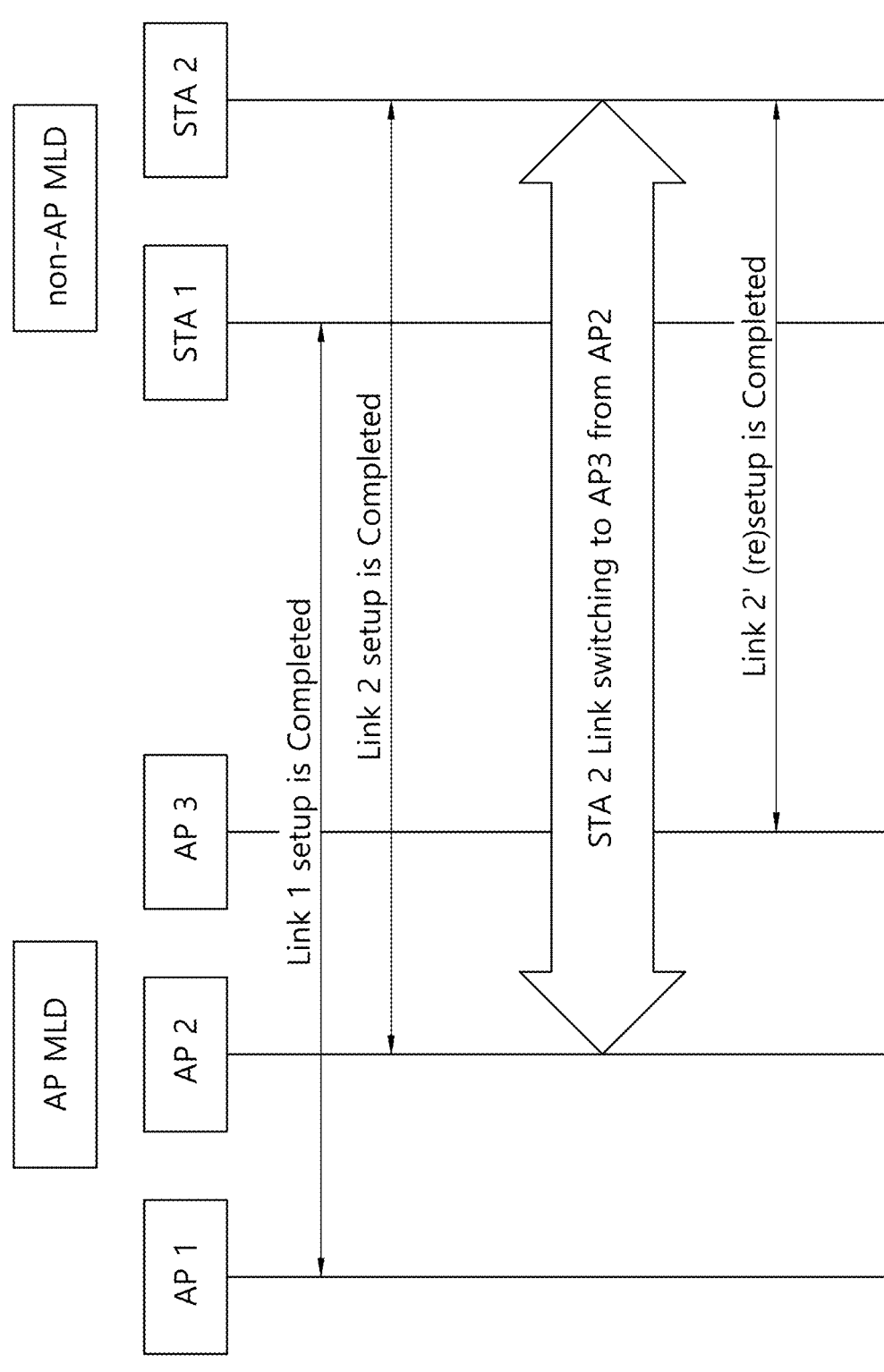
FIG. 15 illustrates a specific example in which Link is changed or reconnected.

FIG. 15 illustrates a specific example in which Link is changed or reconnected.

Referring to FIG. 15, AP 1 of the AP MLD may be connected to STA 1 of the non-AP MLD through link 1. AP 2 of the AP MLD may be connected to STA 2 of the non-AP MLD through link 2. Thereafter, STA 2 may attempt/request connection with AP 3 through link change or reconnection, and STA 2 may connect to AP 3 through link 2 based on the link change or reconnection.

According to an embodiment, the non-AP MLD and the AP MLD may request link transition to improve performance. The AP MLD and the non-AP MLD can transmit/receive/exchange various information and link state information for each current link. Therefore, the AP MLD and the non-AP MLD can select a link more suitable for transmitting and receiving signals based on various information and link states for each current link, and can transmit the above-described information to help the selection. For example, various types of information for each current link may include information about data traffic load for each link and channel access capability between links. For example, a link state may be set to disable or enable.

In the following specification, the process of negotiating with the non-AP MLD/AP MLD to request a change or reconnection to a link other than the link to which the AP MLD/non-AP MLD is connected to improve performance may be referred to as "Link switching negotiation". The name of the "Link switching negotiation" may be called variously, and may be changed.

In the link switching negotiation process, the non-AP MLD (or AP MLD) requests to change the Link connected to a specific STA to another Link, the AP MLD (or non-AP MLD) may respond to this request through a request acceptance or rejection message.

For example, as shown in FIG. 15, when link change is agreed upon through link switching negotiation, the STA may perform a link re-setup process in which the existing link is changed from AP 2 to AP 3 and reconnected.

Hereinafter, a link change or reconnection process can be described by dividing into a case requested by an AP MLD and a case requested by a non-AP MLD.

An Embodiment in which the AP MLD Requests Link Change or Reconnection

According to an embodiment, the AP MLD may request link change or reconnection from the non-AP MLD for efficient data transmission. For example, based on data traffic of each AP for load balancing, the AP MLD may request the STA to change or reconnect to a more efficient link.

For example, AP MLD is non-AP MLD based on data traffic load information for each AP and/or channel access capability information between each link (e.g., Simultaneous TX/RX (STR) capability information, etc.) Links suitable for STAs of can be calculated/confirmed/confirmed. Thereafter, the AP MLD may request link change or reconnection to the STA (or non-AP MLD) based on data traffic load information for each AP and/or channel access capability information between each link.

As described above, when requesting a Link change, the AP MLD may transmit Link information it considers most suitable to the non-AP MLD through a request message. For example, the request message may include a Beacon or a management frame.

In relation to the above-described embodiment, an element or field including link information that is considered most suitable may be newly proposed. A newly proposed element or field may be defined as a "recommended link". "Recommended link" is an example, and the name of a specific element or field may be changed.

recommend link (element/field): An element or field for the AP MLD to recommend the most suitable Link to the STA of the non-AP MLD based on various information (e.g., data load for each Link) for each Link. For example, recommend link (element/field) may be indicated by Link ID information of AP MLD or AP BSS information. In other words, the recommend link (element/field) may include AP MLD Link ID information or AP BSS information.

According to one embodiment, the recommend link (element/field) may optionally be included in a link switching response and transmitted. For example, the STA may establish a connection with the Link recommended by the AP based on the element/field (i.e., recommend Link). For another example, the STA may perform a connection request to a Link different from the indicated Link based on the element/field (i.e., recommend Link) and additional information possessed by the STA.

A detailed signal exchange process between an AP MLD and a non-AP MLD according to the above-described embodiment may be described with reference to FIG. 16.

Figure 16:
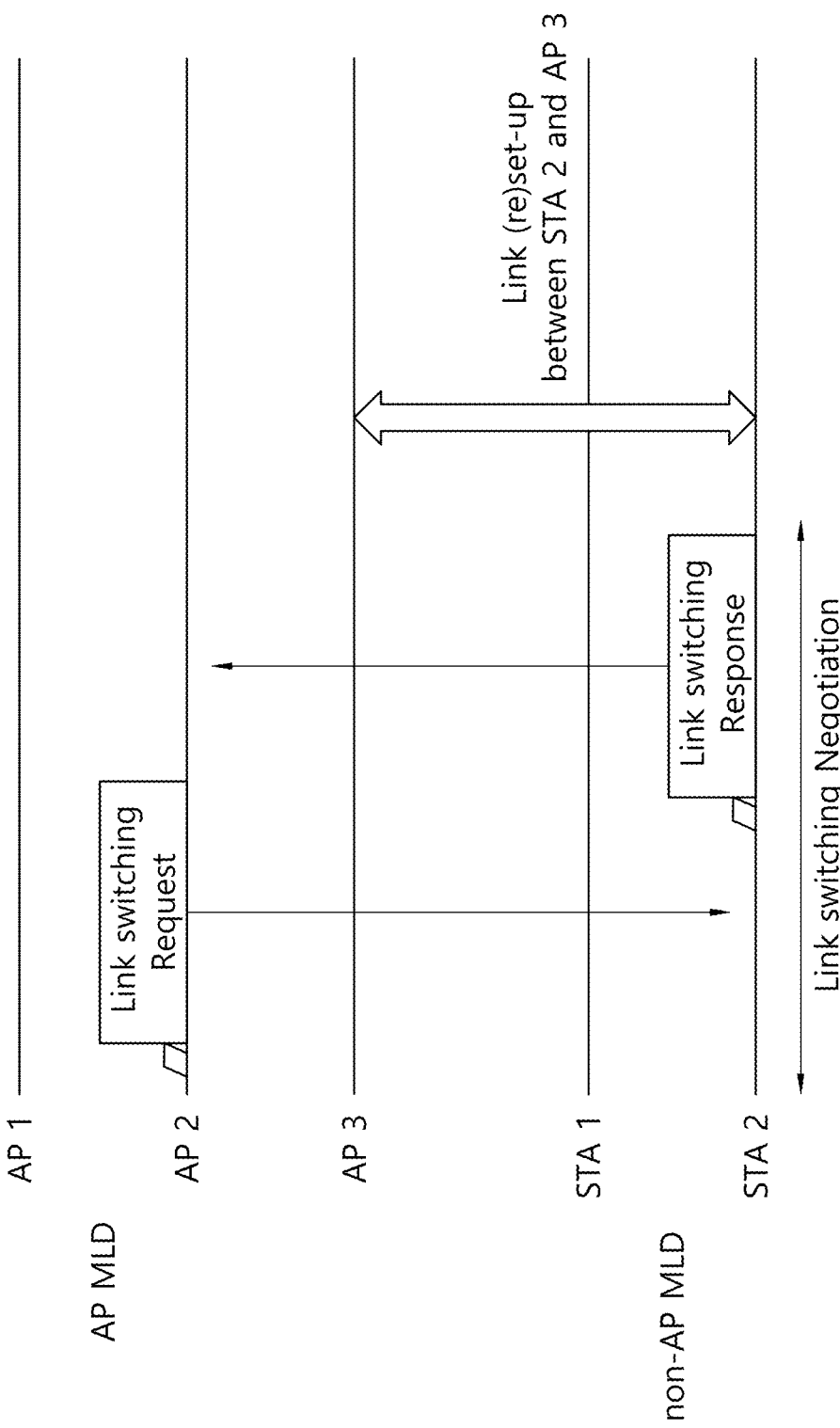
FIG. 16 illustrates operations of an AP MLD and a non-AP MLD for link change or reconnection.

FIG. 16 illustrates operations of an AP MLD and a non-AP MLD for link change or reconnection.

Referring to FIG. 16, in a situation in which STA 2 is connected to AP 2 through link 2, a lot of data traffic may flow to AP 2. In other words, in a situation where STA 2 is connected to AP 2 through link 2, a lot of data traffic may be generated in AP 2.

The AP MLD (or AP 2) may request the non-AP MLD (or STA 2) to reconnect to AP 3 having relatively few STA connections. In general, a message for requesting reconnection is transmitted to the STA (i.e., STA 2) that wants to reconnect, but depending on the situation (e.g., channel status or link status), the message may be transmitted to any STA (i.e., other STA). In other words, based on the channel condition or link condition, the STA to which the request message for requesting reconnection (e.g., Link switching request frame) is transmitted may be changed.

For example, when the STA (i.e., STA 2) receiving the request message for requesting reconnection accepts the request, an "Accept" response message (e.g., Link switching response frame) may be sent. For another example, the STA (i.e., STA 2) may transmit a "Decline" response message when rejecting the request.

In general, the STA accepting reconnection (i.e., STA 2) sends a response message to the existing link (connection link prior to reconnection), the response message may be transmitted through any Link (i.e., another STA) using the multi-link characteristic.

If STA 2 accepts the link reconnection request, after transmitting the response message, STA 2 may disconnect from the existing AP 2 and request link reconnection to AP 3. At this time, the reconnection request process may be performed in the same way as the link setup process between existing MLDs. After the link setup process between AP 3 and STA 2 is completed, STA 2 may perform frame exchange with AP 3 through Link 2.

Conversely, when STA 2 rejects the link reconnection request, STA 2 and AP 2 may use the existing linked link (i.e., link 2) as it is.

According to an embodiment, when an AP requests a link change from an STA, if a suitable link is recommended, the STA may or may not change the link to the recommended link. For example, the above-described recommend link may be used for the AP to recommend a link suitable for the STA.

For example, the STA may approve a link change as a response message to a request message for requesting reconnection of the AP. The STA may approve/confirm the link change with the recommended link, and may request another link change from the AP based on information other than the information included in the request message.

Therefore, the AP needs to inform the STA whether or not to accept the response message. To this end, the AP may transmit a Confirmation message (e.g., link switching confirmation frame) for the STA's response message (e.g., Link switching Response frame) to the STA.

Specific operations of the AP MLD and non-AP MLD of the above-described embodiment may be described with reference to FIG. 17.

Figure 17:
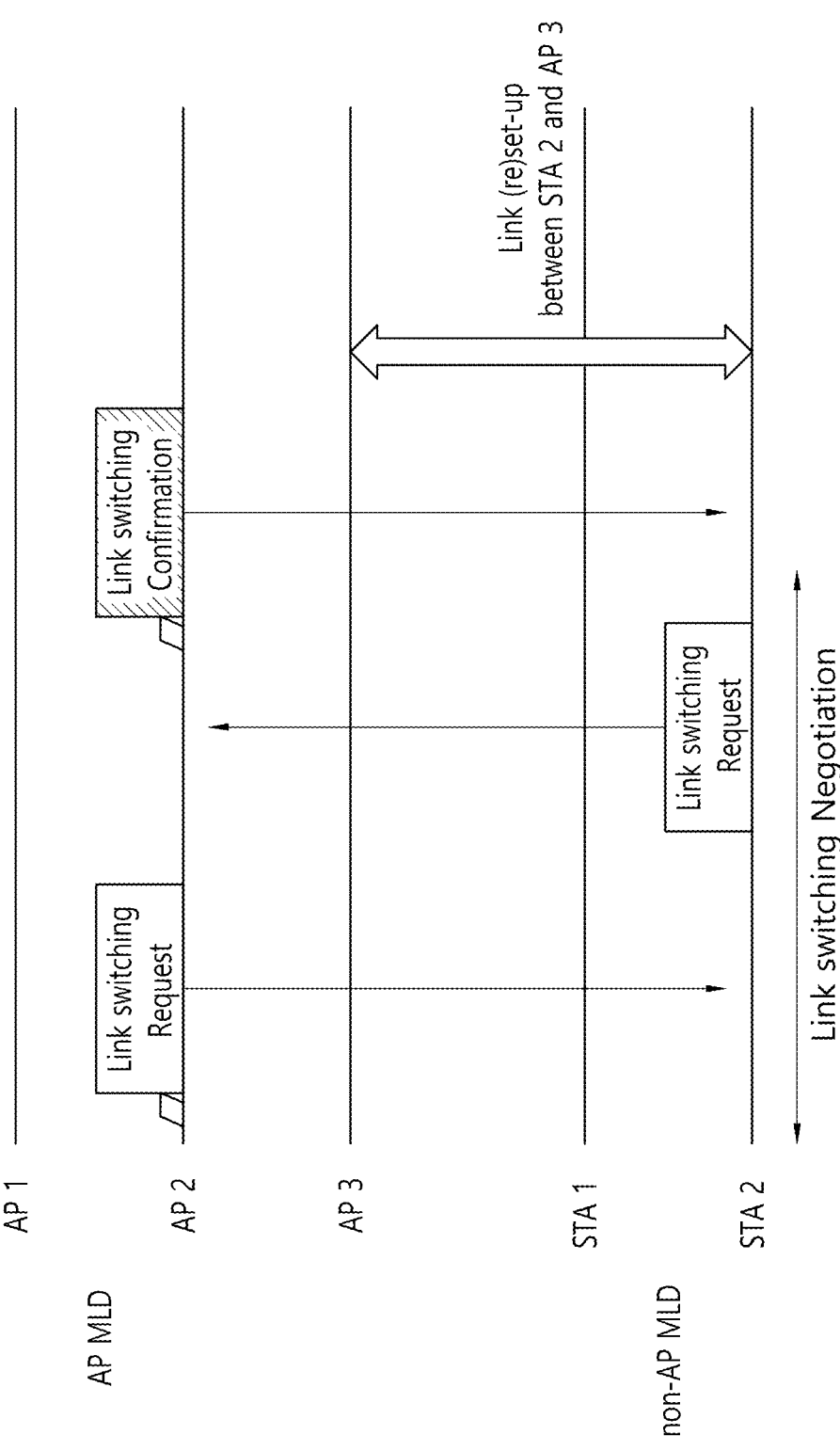
FIG. 17 illustrates operations of an AP MLD and a non-AP MLD for link change or reconnection.

FIG. 17 illustrates operations of an AP MLD and a non-AP MLD for link change or reconnection.

Referring to FIG. 17, AP 2 may request link change from STA 2 including recommended link information. In other words, AP 2 may transmit a link switching request frame including recommended link information to STA 2.

STA 2 may transmit whether to accept the link request through a Link switching Response frame.

For example, when Link switching is accepted, STA 2 may transmit Link switching response frame including Link information to be changed. At this time, Link information to be changed may or may not be the same as the recommended link.

For another example, when STA 2 selects a link other than the recommended link provided by AP 2 and responds with a link switching response frame, the AP may transmit a message on whether or not to approve the final to the STA. The message may be referred to as a Link switching confirmation frame.

For example, AP 2 may accept link change to a link designated by STA 2 through a Link switching Confirmation frame. Based on the Link switching Confirmation frame, STA 2 may attempt to change the link to a link designated by itself.

As another example, AP 2 may reject link change to a link designated by STA 2 through a Link switching Confirmation frame. STA 2 and AP 2 can maintain a connection with an existing Link without changing the link.

The embodiment shown in FIG. 17 can be applied even when the AP transmits the link switching request frame without including recommended link information. For example, when an AP (e.g., AP 2) transmits a Link switching request frame without recommendation link information to an STA (e.g., STA 2), the STA may directly designate a changed Link based on its own information, and then respond to the AP through a Link switching response frame. Even in this case, the AP must finally transmit a Link switching Confirmation frame for approval. Therefore, an embodiment in which the AP transmits a Link switching Confirmation frame even when the recommended link information is not included in the Link switching request frame may be applied.

An Embodiment in which a Non-AP MLD Requests Link Change or Reconnection

According to an embodiment, the non-AP MLD may request link change or reconnection to the AP MLD for efficient data transmission. For example, in order to use the STR capability during data transmission, the non-AP MLD may request connection link change or reconnection from the AP MLD.

Figure 18:
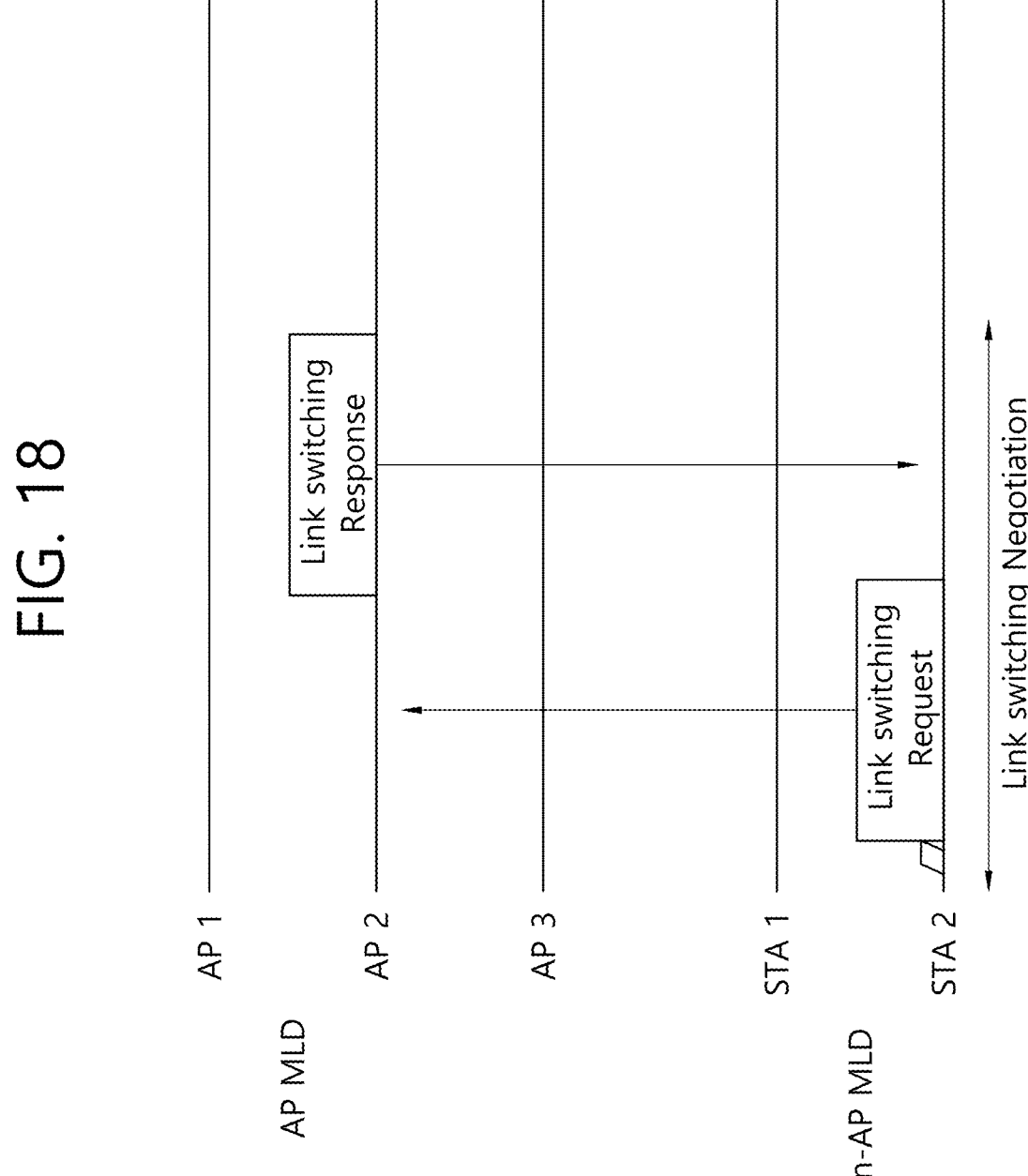
FIG. 18 illustrates operations of an AP MLD and a non-AP MLD for link change or reconnection.

FIG. 18 illustrates operations of an AP MLD and a non-AP MLD for link change or reconnection.

Referring to FIG. 18, an AP MLD and a non-AP MLD may perform link switching negotiation. STA 2 of the non-AP MLD may transmit a link switching request frame to AP 2 of the AP MLD. AP 2 of the AP MLD may transmit a link switching response frame to STA 2 of the non-AP MLD in response to the link switching request frame. The link switching request frame or link switching response frame may be transmitted and received through a link to be changed, but is not limited thereto. A link switching request frame or a link switching response frame may be transmitted and received through various links as well as a link to be changed.

EHT (802.11be) considers a multi-link device (MLD) structure in which one AP/non-AP MLD supports multiple links as a major technology. In the case of supporting Multi-Link, an STA may transmit information about other STAs in a non-AP MLD together through one link. This characteristic can reduce the overhead of frame exchange, increase the STA's link use efficiency, and reduce power consumption. Therefore, this specification proposes a Buffer Status Report method considering Multi-Link, which can transfer the Buffer Status information of other Links at once through one Link.

This specification proposes a Buffer Status Report (BSR) operation considering multi-link usable in an 802.11be environment supporting multi-link.

In an AP/non-AP MLD connection structure connected by multiple Links, data transmission can be efficient if Buffer status information of other STAs in the same non-AP MLD can be transmitted together through one Link. At this time, it is assumed that each STA in the non-AP MLD has its own Buffer Queue.

Figure 19:
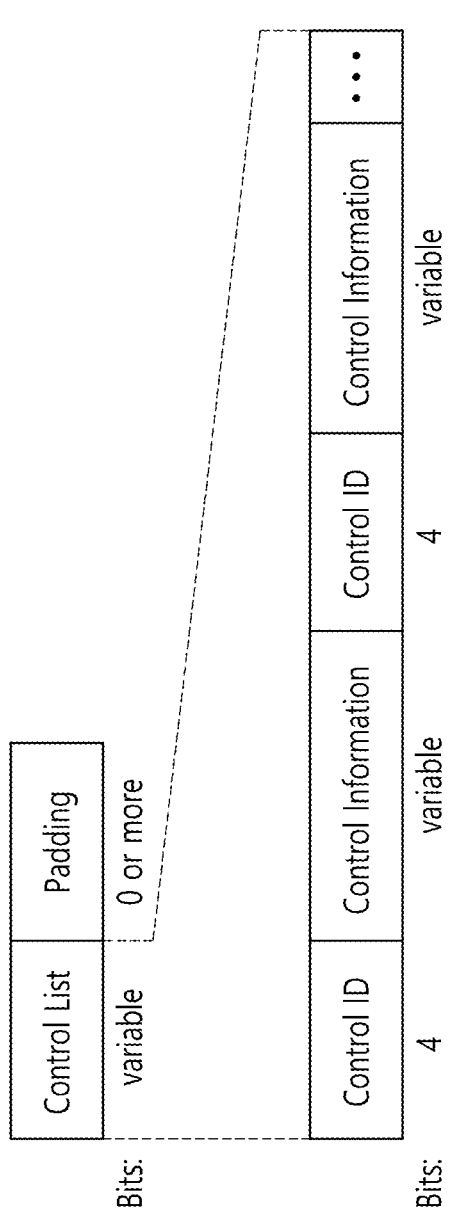
FIG. 19 shows an example of the format of an A-Control field and a Control subfield.

In the existing 802.11ax standard, an A-Control field and a Control subfield as shown in FIG. 19 are proposed to provide and control various information of the STA to the AP.

FIG. 19 shows an example of the format of an A-Control field and a Control subfield.

The upper part of FIG. 19 shows the format of the A-Control field of the HE variant HT Control field. The A-Control field has a length of 30 bits.

Referring to the bottom of FIG. 19, the Control List subfield of the A-Control field includes at least one Control subfield. The lower part of FIG. 19 shows that two Control subfields are included in the Control List subfield.

The Control ID subfield indicates the type of information delivered in the Control Information subfield. The length of the Control Information subfield is fixed for each value of the non-reserved Control ID subfield. The value of the Control ID subfield and the associated value of the Control Information subfield are defined as follows.

TABLE 1

| Control ID value | Meaning | Length of the Control Information subfield (bits) |
|---|---|---|
| 0 | Triggered response scheduling (TRS) | 26 |
| 1 | Operating mode (OM) | 12 |
| 2 | HE link adaptation (HLA) | 26 |
| 3 | Buffer status report (BSR) | 26 |
| 4 | UL power headroom (UPH) | 8 |
| 5 | Bandwidth query report (BQR) | 10 |
| 6 | Command and status (CAS) | 8 |
| 7-14 | Reserved | |
| 15 | Ones need expansion surely (ONES) | 26 |

By including the value of the Control ID subfield defined in the table above and control information corresponding to the value in the Control Information subfield within the Control subfield and transmitting it, the STA can control or indicate various pieces of information.

If present, the Padding subfield comes after the last Control subfield and is set to a sequence of 0 to match the length of the A-Control field transmitted in the HT Control field to 30 bits.

802.11be proposes a multi-link device (MLD) structure supporting multi-link. Therefore, this specification proposes a control subfield structure considering multi-link in which an STA can request control information for several links (i.e., other STAs) at once.

To this end, this specification proposes the following Control subfield structure considering multi-link.

Figure 20:
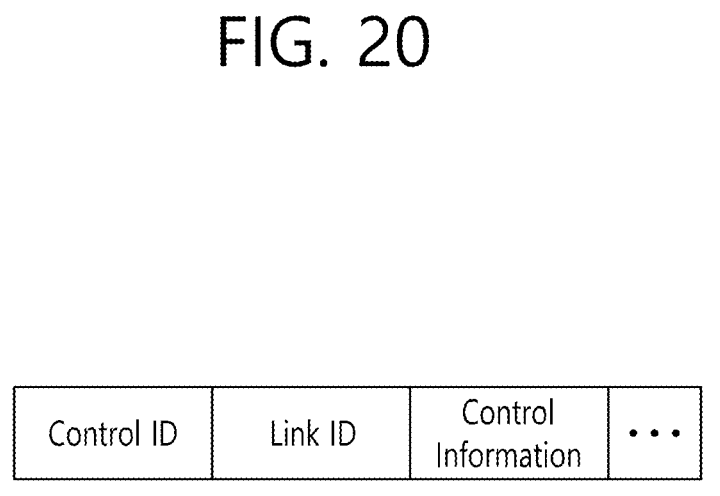

FIG. 20 shows an example of a Multi-link Control subfield format for indicating multi-link.

Unlike the existing structure, in the structure of FIG. 20, a Link ID subfield exists along with a Control Information subfield after Control ID. At this time, the Control Information subfield includes Control information information corresponding to the Link indicated through the Link ID field. At this time, information on at least one link may be indicated for one Control ID. Since the Multi-link Control subfield indicates control information for each link, control information for other STAs in the non-AP MLD can be indicated together in one frame.

At this time, a new 'Control Information per Link' subfield including a Link ID subfield and a Control information subfield may be defined. An example of a detailed subfield structure for this is shown in FIG. 21.

Figure 21:
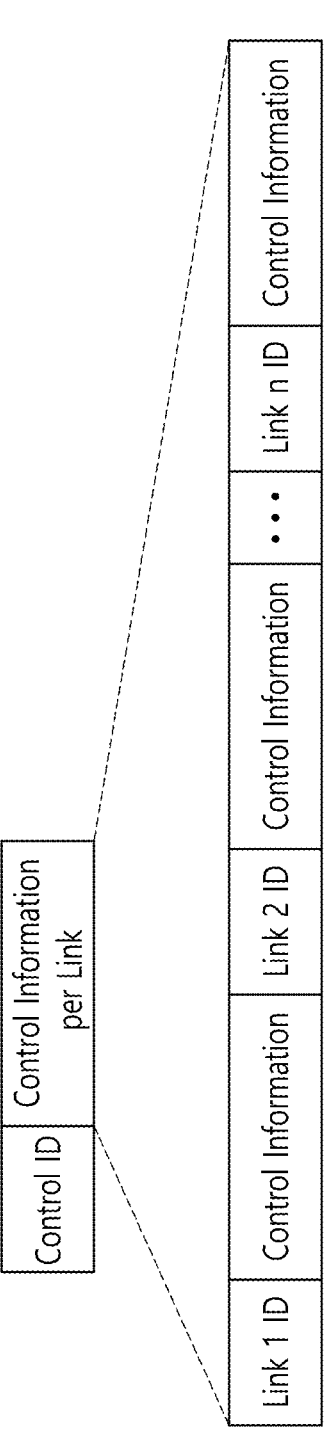
FIG. 21 shows an example of a detailed structure of a Multi-link Control subfield format.

FIG. 21 shows an example of a detailed structure of a Multi-link Control subfield format.

As shown in FIG. 21, the Multi-link Control subfield has a Control information per Link subfield including Control information for each Link together with a Control ID, this Control information per Link subfield may have a structure in which Link ID information for indicating each Link and Control information field indicating information corresponding to this link are sequentially displayed.

For example, in the case of a field where the Control ID value is indicated as 3 to indicate the STA's BSR information, the Control Information per Link (i.e. Control information per Link) subfield includes Buffer status information for each Link (i.e., STA).

In this way, the reason why the information about each STA is indicated as the Link ID subfield in order to deliver information about other STAs through one link in this specification is that non-AP MLD and AP MLD This is because the Link ID subfield is used when determining which AP to establish a link with. In other words, since the non-AP MLD and AP MLD exchange Link ID information (i.e., Link ID subfield) for each link in the multi-link setup (i.e., association) process, the non-AP MLD determines which link each link It already knows if it has an identifier. Therefore, when transmitting information on other STAs in one frame, if information on other STAs is divided into Link ID subfields and transmitted, upon receiving this, the AP MLD can separately receive Link ID information and corresponding Control information regardless of the received Link.

The non-AP MLD may initiate multi-link setup related to the AP MLD to (re)establish one or more links with APs associated with the AP MLD. When the non-AP MLD initiates multi-link (re)setup with the AP MLD, the STA belonging to the non-AP MLD must transmit a (Re)Association Request frame in the link to be used as part of the multi-link (re)setup. The AP associated with the AP MLD must transmit the (Re)Association Response frame in the link receiving the (Re)Association Request frame.

An STA belonging to a non-AP MLD that initiates multi-link (re)setup with an AP MLD must include a Basic Multi-Link element in the transmitted (Re)Association Request frame.

Basic Multi-Link element included in (Re)Association Request frame must include Common Info field and Link Info field.

In addition to the link through which the (Re)Association Request frame is transmitted, the Link Info field of the Basic Multi-Link element included in the (Re)Association Request frame must include the corresponding Per-STA Profile subelement for each requested link. For each Per-STA Profile subelement included in the Link Info field, the Complete Profile subfield of the STA Control field shall be set to 1.

The Link ID subfield of the STA Control field of the Per-STA Profile subelement for the non-AP STA requesting a link for multi-link (re)setup with the AP MLD is set as the link ID of the AP associated with the AP MLD operating on the corresponding link. Link ID is obtained during multi-link discovery.

The STA may indicate control information for several links to the AP at once by including Control information per Link corresponding to several Control IDs in the Control List subfield of the A-Control field. A detailed field structure for this is shown in FIG. 22.

Figure 22:
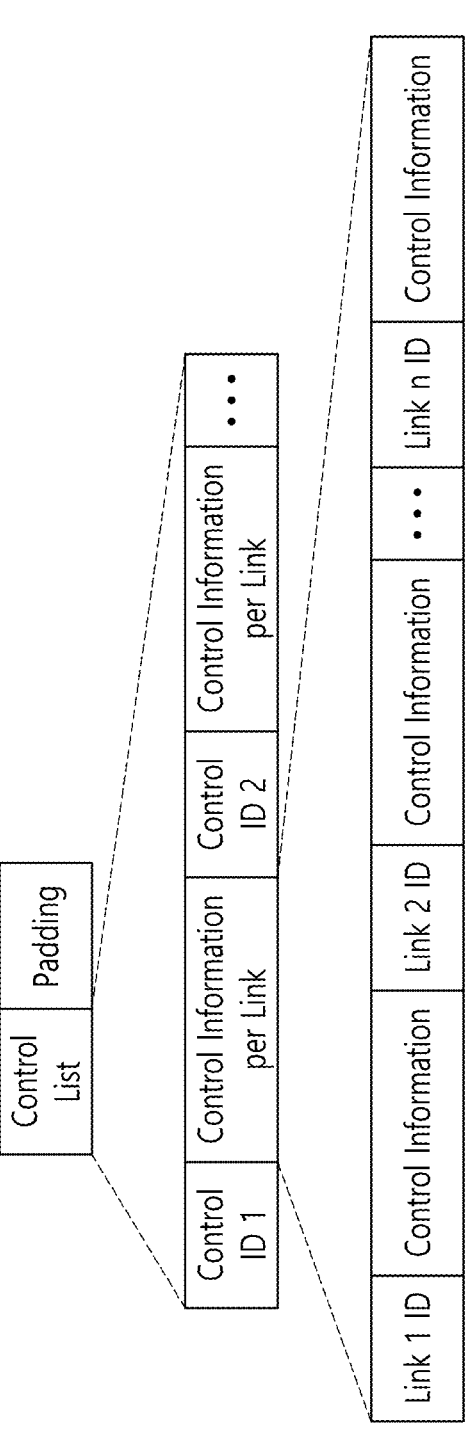
FIG. 22 shows an example of a Control List subfield format within an A-Control field considering multi-link.

FIG. 22 shows an example of a Control List subfield format within an A-Control field considering multi-link.

In the present specification, a field structure in which an STA can deliver several pieces of control information at once for several links is proposed. In the case of the above definition, the STA can transmit control information for other STAs at once by transmitting including Control information subfield information for each Link in the Control Information per Link subfield. This field structure considering multi-link is particularly useful for non-AP MLD operating in power save mode. In 802.11be, for MLD supporting multi-link, beacon reception is not required for all links. This means that some links (e.g. anchor links) are periodically awake for beacon reception, but some other links (e.g. non-anchor links) can remain doze regardless of beacon reception to reduce power. As such, in the case of a non-AP MLD operating in power save mode, it is inefficient in terms of power consumption to awake all corresponding links to transmit control information of the STA through the A-Control field. Therefore, using the method and structure proposed in this specification, if all links can transmit one frame including information of other STAs together using links of STAs currently in an awake state or waiting for transmission of UL traffic, without needing to be awake for information transmission, this will be very efficient not only in terms of frame overhead but also in terms of power saving.

Additionally, in this specification, a structure for indicating control information for several links usable in 802.11be is proposed as follows.

When requesting control information through the existing Link ID field, since the Link ID field is 4 bits, it may be difficult to indicate and request information of several links at once through the A-Control (sub) field. The A-Control (sub)field structure defined in the existing 802.11ax is the same as the top of FIG. 19.

Accordingly, in the present specification, a Link ID Indication (LII) Bitmap capable of indicating several links at once is defined.

LII (Link ID Indication) Bitmap: This is a bitmap for indicating indicators of multiple links as one (sub)field.

If a specific Link ID can be indicated through the LII Bitmap, the STA can provide control information information of several links through one A-Control field. An embodiment for this is shown in FIG. 23.

Figure 23:
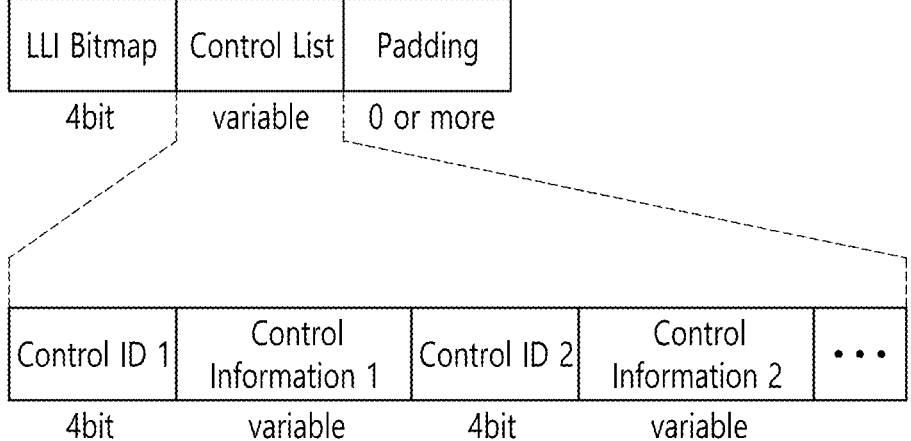
FIG. 23 shows an example of an A-Control field format considering MLD.

FIG. 23 shows an example of an A-Control field format considering MLD.

As shown in FIG. 23, considering MLD, the present specification proposes a transmission format including LII Bitmap information together in order to include information of several links in the A-Control subfield. When using the A-Control field having the structure shown in FIG. 23, the non-AP MLD indicates information of the currently provided link through the LII Bitmap (for example, including specific link indicator information such as Link 2 and Link 3), indicates control information currently indicated through the Control ID, and provides control Information corresponding to the Control ID.

Figure 24:
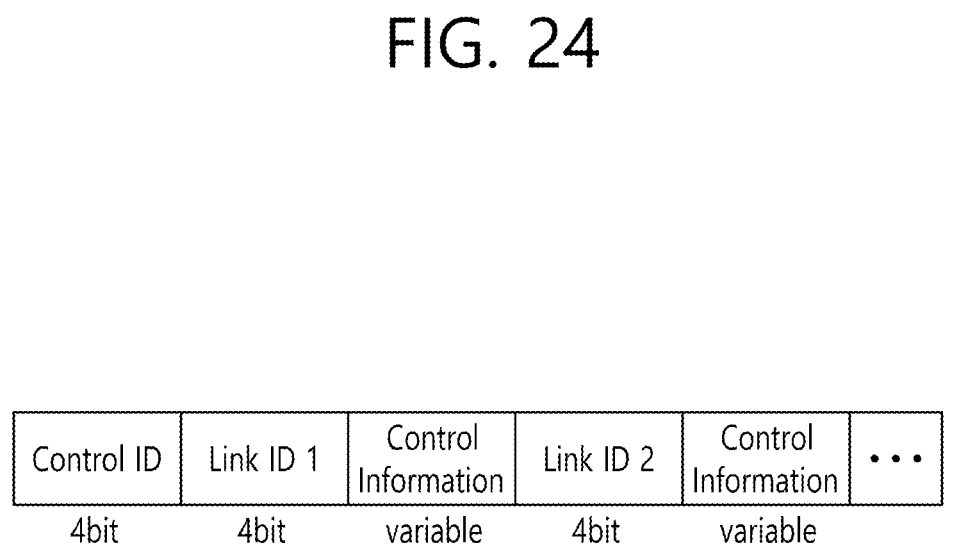

In addition, although the non-AP MLD requests information of the same Information type, considering the case of having different Control Information for each link (when the corresponding Control Information is defined as STA Level information rather than MLD Level), the format shown in FIG. 24 is proposed. Corresponding information can be included in the Control List (sub)field.

FIG. 24 shows an example of a Control List subfield including different Control Information for each link.

Referring to FIG. 24, the Control List subfield included in the A-Control field indicates the information type of Control information included by the STA through the Control ID, thereafter, link information about which link information the STA includes may be indicated through a link indicator (e.g., Link ID). However, in the case of the method, there is a disadvantage that information provision for several links is limited or only a specific information type can be used depending on the length of control information according to the information type. Therefore, in order to solve this problem, an indicator for indicating several separate links or lightweight control information for requesting information of several links at once may be required.

Figure 25:
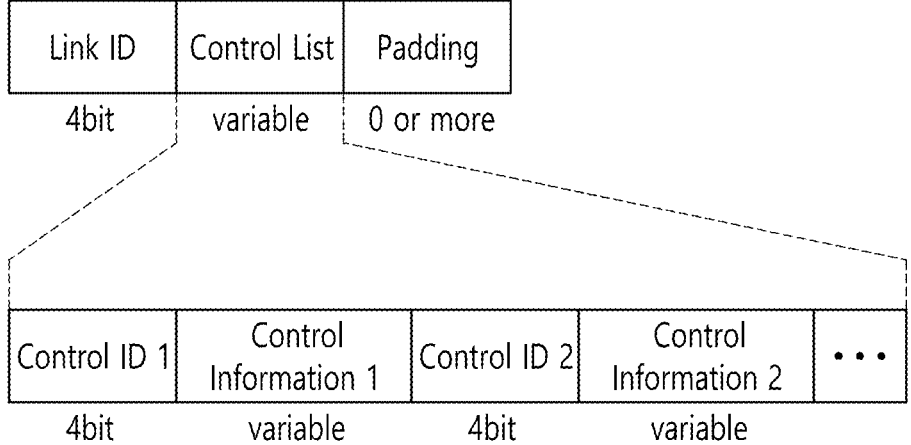
FIG. 25 shows an example of a Control List subfield including several types of Control information.

FIG. 25 shows an example of a Control List subfield including several types of Control information.

In addition, when providing various types of control information for a specific link, the format shown in FIG. 25 may be considered.

As shown in FIG. 25, when Link ID information is included in the A-Control subfield, the non-AP MLD can provide various types of control information information for a specific link in one message. However, in this case, due to the length of the A-Control subfield, the contents included may be limited according to the length of control information according to the information type. For this purpose, it may be necessary to propose a control information format for additional MLD.

Figure 26:
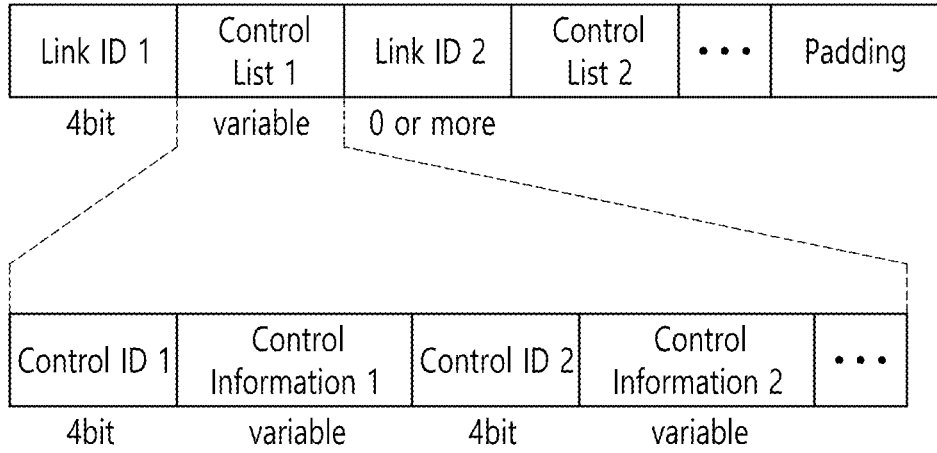
FIG. 26 shows an example of an A-Control field including a plurality of types of control information for a plurality of links.

Also, information on multiple links rather than one link may be included in one A-control subfield as shown in FIG. 26.

FIG. 26 shows an example of an A-Control field including a plurality of types of control information for a plurality of links.

Referring to FIG. 26, the A-Control subfield includes a link indicator (e.g., Link ID) and a Control List subfield indicated by the link indicator, and the Control List subfield includes a plurality of Control IDs and each of the Control information of the information type indicated through the Control ID may be included.

However, in this case, due to the length of the A-Control subfield, the contents included may be limited according to the length of control information according to the information type. For this purpose, it may be necessary to propose a control information format for additional MLD.

Figure 27:
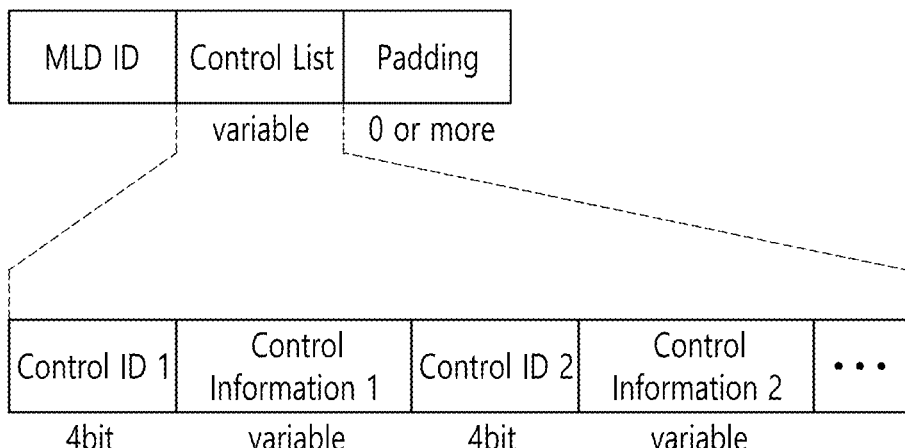
FIG. 27 shows an example of an A-Control field including MLD ID.

Additionally, in this specification, a structure for MLD level control information usable in 802.11be is proposed as shown in FIG. 27. 802.11be already considers having values at the MLD level rather than the STA level for several operations or fields. For example, in the case of the Listen interval field, it is defined at the MLD Level, and all links of the non-AP MLD are set to the same value. Therefore, if the operation controlled through the A-Control (sub)field and the information provided are defined as MLD Level, they may be provided in MLD units without distinction for each link. A format for this is proposed as shown in FIG. 27.

FIG. 27 shows an example of an A-Control field including MLD ID.

If the information type (see Table 1 above) previously provided as control information is defined as the same value for each MLD (i.e., defined as MLD level information), the A-Control field in FIG. 27 is included in the Control List. It is defined as a standard that transmits information about MLD along with MLD ID information. When Control information is provided through the A-Control subfield along with the corresponding MLD ID information, the AP can confirm that the information of the A-Control field is control information for the MLD level and has the same value for all links within the MLD.

In particular, the present specification focuses on the BSR (Buffer Status Report) operation of non-AP MLD and proposes a BSR Control Information subfield structure for BSR operation considering multi-link that can increase various efficiencies as follows.

Figure 28:
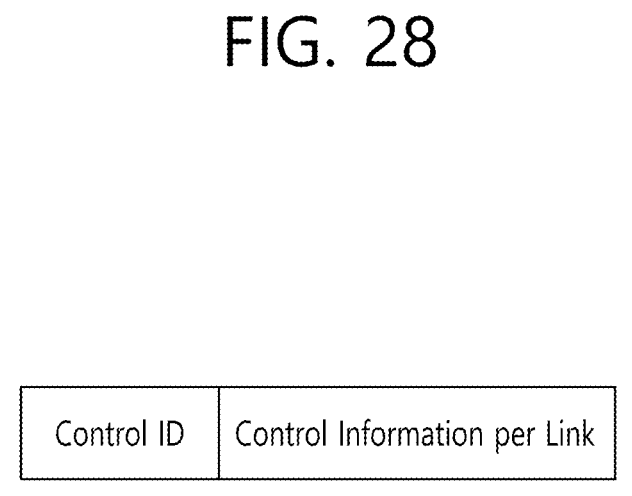

To this end, a control subfield structure considering BSR multi-link as shown in FIG. 28 is proposed.

FIG. 28 shows an example of a BSR Control subfield for indicating multi-link.

Since the BSR Control subfield of FIG. 28 includes control information for each link, BSR information for all STAs in the non-AP MLD can be displayed in one frame.

Figure 29:
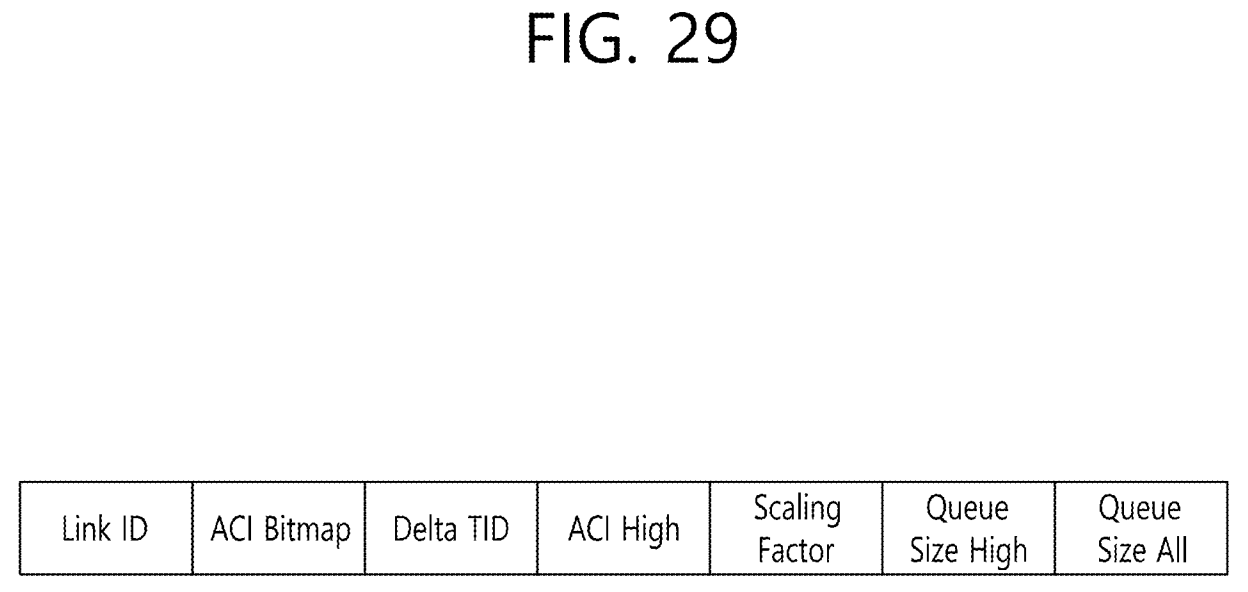

The proposed BSR Control Information subfield structure for each link is shown in FIG. 29.

FIG. 29 shows an example of a BSR Control Information subfield for indicating Multi-Link.

The Control Information per Link subfield in the BSR Control subfield has as many BSR Control Information subfields as the number of Links in the non-AP MLD (see FIG. 29).

The Link ID subfield means a link identifier for identifying a link, and the rest of the fields are the same as the field values defined in the existing 802.11 standard. An example of the BSR Control subfield for each link using the link identifier is shown in FIG. 30.

Figure 30:
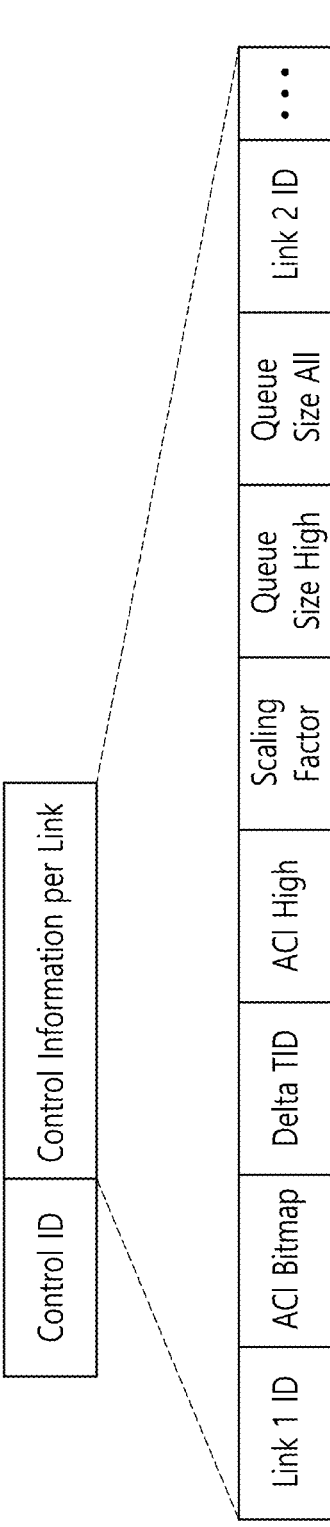
FIG. 30 shows an example of a BSR Control subfield considering multi-link.

FIG. 30 shows an example of a BSR Control subfield considering multi-link.

FIG. 30 shows a configuration of a BSR Control subfield considering multi-link including BSR Control information according to Link 1 ID and BSR Control information according to Link 2 ID.

Additionally, this specification proposes a lightweight BSR Control subfield suitable for multi-link devices. According to the existing standard, the Control ID field is 4 bits and the length of the Control information subfield corresponding to the BSR is 26 bits (see Table 1 above). The sum of these two equals 30 bits. Currently, the length of the A-Control field defined in 802.11ax is 30 bits (see FIG. 19).

Therefore, when link indicator information for requesting information for each link of a multi-link device is included, the length of the existing standard may be exceeded. Therefore, in this specification, a new format in which the control information format defined for BSR operation is lightened is proposed as follows.

Figure 31:
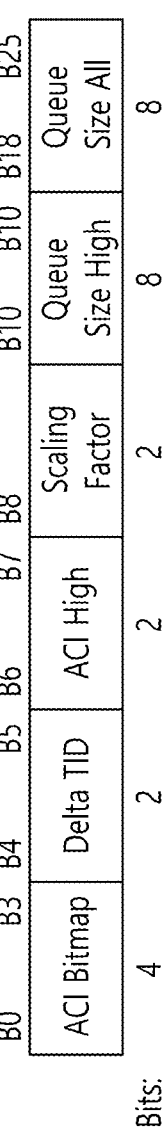
FIG. 31 shows the Control Information subfield within the BSR Control subfield defined in 802.11ax.

First, the control information subfield format for the existing BSR control is shown in FIG. 31.

FIG. 31 shows the Control Information subfield within the BSR Control subfield defined in 802.11ax.

Referring to FIG. 31, the Control Information subfield in the BSR Control subfield defined in the 802.11 standard includes buffer status information used for UL MU operation.

The ACI Bitmap subfield indicates the access category for which the buffer status is reported, and its encoding is shown in Table 2. Each bit of the ACI Bitmap subfield is set to 1 to indicate that the buffer status of the corresponding AC (Access Category) is included in the Queue Size All subfield, and is set to 0 otherwise. However, when the ACI Bitmap subfield is 0 and the Delta TID subfield is 3, it is set as above except that the buffer status of all 8 Traffic Identifiers (TIDs) is included. (See Table 3).

TABLE 2

| B0 | B1 | B2 | B3 |
|---|---|---|---|
| AC_BE | AC_BK | AC_VI | AC_VO |

The Delta TID subfield indicates the number of TIDs for STAs reporting the buffer status together with the value of the ACI Bitmap subfield. The encoding of the Delta TID subfield is defined in Table 3.

TABLE 3

| Number of bits in the ACI Bitmap subfield that are set to 1 | Mapping of Delta TID subfield value and number of TIDs, $N_{TID}$ |
|---|---|
| 0 | Values 0 to 2 are not applicable; Value 3 indicates 8 TIDs (i.e, all ACs have traffic) |
| 1 | Value 0 indicates 1 TID; Value 1 indicates 2 TIDs; Values 2 to 3 are not applicable; |
| 2 | Value 0 indicates 2 TID; Value 1 indicates 3 TIDs; Value 2 indicates 4 TIDs; Value 3 is not applicable; |

TABLE 3-continued

| Number of bits in the ACI Bitmap subfield that are set to 1 | Mapping of Delta TID subfield value and number of TIDs, $N_{TID}$ |
|---|---|
| 3 | Value 0 indicates 3 TID; Value 1 indicates 4 TIDs; Value 2 indicates S TIDs; Value 3 indicates 6 TIDs; |
| 4 | Value 0 indicates 4 TID; Value 1 indicates 5 TIDS; Value 2 indicates 6 TIDs; Value 3 indicates 7 TIDs; |

NOTE 1

The number of TIDs can be obtained as $N_{TID} = N_{ones} + D_{Val}$ where $N_{ones}$ is the number of bits set to one in the AC Bitmap subfield, and $D_{Val}$ is the value of the Delta TID subfield except if $N_{ones}$ is equal to 0 for which there is the $N_{TID} = 8$ case.

NOTE 2

The Delta TID might be used by an AP to determine the setting of the TID Aggregation Limit field in the User Info field addressed to the STA in a subsequent Basic Trigger frame.

The ACI High subfield indicates the ACI of the AC for which the BSR is indicated in the Queue Size High subfield. ACI to AC mapping is shown in Table 4.

TABLE 4

| ACI | AC | Description |
|---|---|---|
| 0 | AC_BE | Best effort |
| 1 | AC_BK | Background |
| 2 | AC_VI | Video |
| 3 | AC_VO | Voice |

The Scaling Factor subfield indicates the unit SF (Scaling Factor, Octet) of the Queue Size High and Queue Size All subfields. The encoding of the Scaling Factor subfield is shown in Table 5.

TABLE 5

| Scaling Factor subfield | Scaling factor, SF, in octets |
|---|---|
| 0 | 16 |
| 1 | 256 |
| 2 | 2 048 |
| 3 | 32 768 |

The Queue Size High subfield indicates the amount of traffic buffered for the AC identified by the ACI High subfield for the STA identified by the receiver address of the frame including the BSR Control subfield in units of SF octets.

The Queue Size All subfield indicates the amount of buffered traffic in units of SF octets for all ACs identified by the ACI Bitmap subfield for the STA identified by the receiver address of the frame including the BSR Control subfield.

The queue size value of the Queue Size High and Queue Size All subfields is a value obtained by rounding the total size of all MSDUs and A-MSDUs (including MSDUs or A-MSDUs in the same PSDU as the frame containing the BSR Control subfield) buffered in the STA to the nearest multiple of SF octets in the delivery queue used for MSDUs and A-MSDUs with AC(s) specified in the ACI High and ACI Bitmap subfields, respectively.

A queue size value of 254 in the Queue Size High and Queue Size All subfields indicates that the amount of buffered traffic is greater than 254×SF octets. A queue size value of 255 in the Queue Size High and Queue Size All subfields indicates that the amount of buffered traffic is unspecified or unknown.

The queue size value of QoS data frames containing fragments can be kept constant in all fragments even if the amount of queued traffic changes as successive fragments are transmitted. When a QoS data frame including a fragment is delivered in an A-MPDU, the queue size value of the MPDU including a fragment is set according to the rules of the HT control field operation.

In 802.11be, the Link ID subfield was defined as an indicator for indicating each link, and it was agreed to define it as 4 bits. Considering this, when the Link ID subfield is included in the control information for requesting BSR information for each link of MLD, 4 bits are exceeded, so a lightweight format considering this is required to reuse the existing A-Control field. The way to narrow the existing A-Control field to request BSR information for each link of MLD is as follows.

1) Format Omitting Queue Size all Information

When the STA provides its Buffer Status information by BSR operation (Solicited method or Unsolicited method), an embodiment is shown in FIG. 32 as a new format for omitting Queue Size all information.

FIG. 32 shows an example of the Control Information subfield of the A-Control field for requesting BSR information of MLD.

The Queue Size All subfield included in the existing format (FIG. 31) is a field indicating the amount of buffered traffic for all ACs identified by the ACI bitmap subfield. If the Queue Size All subfield is omitted, the Control Information subfield for BSR control may include only information on the amount of buffered traffic for the AC identified by the ACI High subfield.

As such, when using the new format of FIG. 32, during BSR operation considering MLD, the STA provides buffer information together with Link ID information, information on the amount of buffered traffic in the queue for a specific AC of a specific link (that is, indicated through ACI High) can be provided through the A-Control field. In addition, in some cases (for example, ACI Bitmap value), the Delta TID subfield may be omitted, and if an indicator for indicating a separate Link ID exists in the A-Control field, the Link ID of FIG. 32 Subfields may also be omitted.

2) Format Omitting ACI High Information

Figure 33:
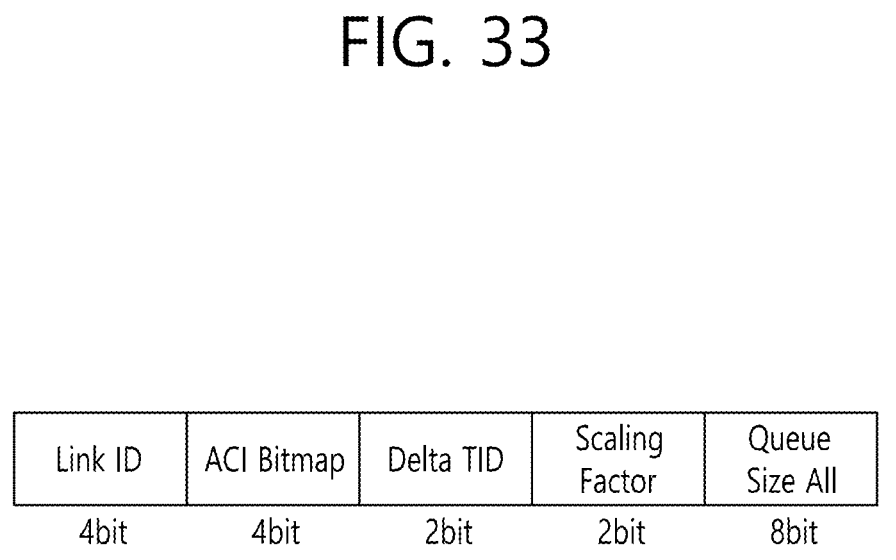

An example of a new format for the case where the ACI High information is omitted when the STA provides its own Buffer Status information by BSR operation (Solicited method or Unsolicited method) is shown in FIG. 33.

FIG. 33 shows another example of the Control Information subfield of the A-Control field for requesting BSR information of MLD.

Referring to FIG. 33, the STA provides Link ID and Queue Size all information, provides the amount of Buffered traffic for all ACs indicated through the ACI Bitmap of a specific Link, and provides the amount of buffered traffic for each Link through the A-Control field. Only Buffer information of All Queue can be provided. That is, it is not possible to provide the amount of traffic buffered in the queue of a specific AC by omitting ACI High and Queue Size High information in the Control Information subfield for the existing BSR Control, but the current total buffer amount of a specific link has the format of FIG. 33 (e.g., the total buffer means the buffer amount for ACs indicated through the ACI Bitmap). In addition, traffic for which ACs may be identified through an ACI Bitmap. In addition, in some cases (e.g., ACI Bitmap value), the Delta TID subfield may also be omitted, if an indicator for indicating a separate Link ID exists in the A-Control field, the Link ID subfield of FIG. 33 may also be omitted.

Unlike the conventional method of indicating Buffer status information for one STA indicated by one RA, this specification proposes a method of indicating Buffer status information for all STAs in a non-AP MLD in one frame.

Upon receiving this, the AP MLD can allocate resources for UL-MU operation in consideration of the Buffer status of all STAs in the non-AP MLD.

An example of the field format proposed in FIGS. 32 and 33 can be included in the BSR Control frame and used in the Solicited BSR method and the Unsolicited BSR method provided by the 802.11 standard.

FIGS. 32 and 33, when providing Buffer Status Information of all Links in one frame and delivering it to the AP, buffer status information of all links (i.e., STAs) in the non-AP MLD can be obtained with one frame exchange. Through this, resources for proper UL-MU operation can be provided for each link (i.e., each STA). When a field structure considering multi-link is used in this way, it is particularly useful for non-AP MLD operating in power save mode. In 802.11be, for non-AP MLD supporting multi-link, Beacon reception is not required for all links. This means that some links (e.g. anchor links) are periodically awake for beacon reception, but some other links (e.g. non-anchor links) can remain doze regardless of beacon reception to reduce power. As such, in the case of a non-AP MLD operating in power save mode, it is inefficient in terms of power consumption to awake all corresponding links to transmit control information of the STA through the A-Control field. Therefore, using the method and structure proposed in this specification, without the need for all links to be awake for information transmission, one frame including the information of other STAs can be transmitted using links of STAs currently in an awake state or currently waiting to transmit UL traffic, which is not only a frame overhead aspect. In addition, it has the effect of being very efficient in terms of power saving.

Figure 34:
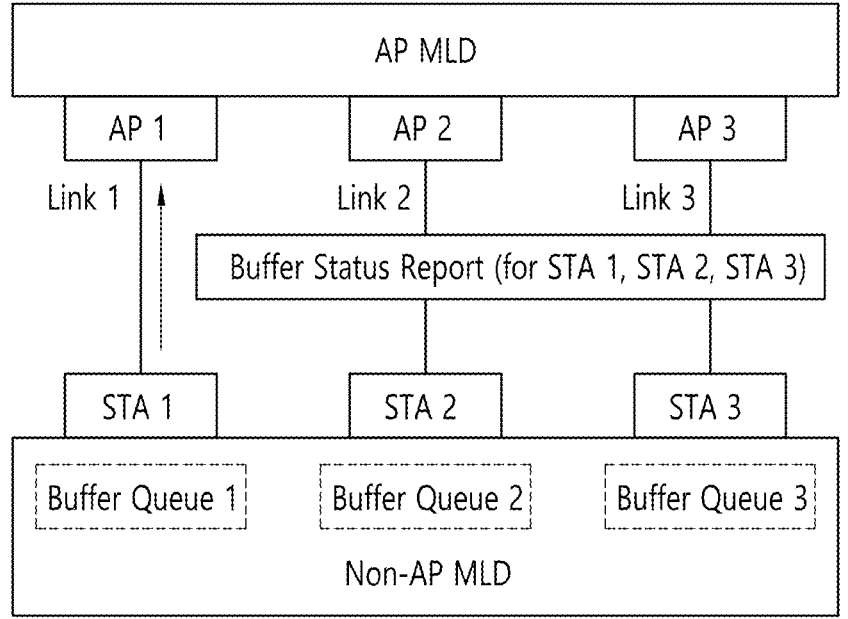
FIG. 34 shows an example of BSR operation considering multi-link.

FIG. 34 shows an example of BSR operation considering multi-link.

In the case of unsolicited BSR operation as shown in FIG. 34, STA 1 of the non-AP MLD may transmit buffer status information of all STAs (i.e., STA 1, STA 2, and STA 3) to the AP MLD through Link 1 in one frame. At this time, the STA (for example, STA 1) transmitting the BSR may be any STA as long as the Link is in an awake state when the Link is in enable or power save mode. The Buffer Status Report frame of FIG. 34 includes Buffer Status information for all links of the non-AP MLD, including the Control Information per Link subfield mentioned in FIGS. 32 and 33.

Even in a Solicited BSR operation in which an AP requests a BSR from an STA, the STA may transmit the BSR for all STAs in the non-AP MLD by responding to the proposed frame through one link, as in FIG. 34.

Hereinafter, the above-described embodiment will be described with reference to FIG. 1 to 34.

Figure 35:
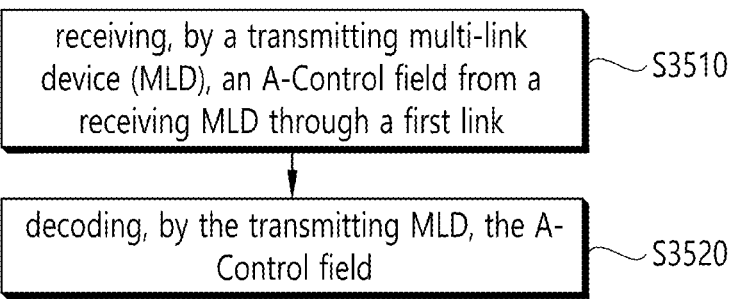
FIG. 35 is a flowchart illustrating a procedure in which a transmitting MLD receives BSR information from a receiving MLD based on an A-Control field according to this embodiment.

FIG. 35 is a flowchart illustrating a procedure in which a transmitting MLD receives BSR information from a receiving MLD based on an A-Control field according to this embodiment.

The example of FIG. 35 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment newly defines the existing A-Control field to support Multi-Link, and propose a method and apparatus for transmitting and receiving BSR information of another link (or other receiving STA) based on the newly defined A-Control field. Here, the transmitting MLD may correspond to the AP MLD, and the receiving MLD may correspond to the non-AP MLD.

In step S3510, a transmitting multi-link device (MLD) receives an A-Control field from a receiving MLD through a first link.

In step S3520, the transmitting MLD decodes the A-Control field.

The transmitting MLD includes a first transmitting station (STA) operating on the first link, a second transmitting STA operating on a second link, and a third transmitting STA operating on a third link.

The receiving MLD includes a first receiving STA operating on the first link, a second receiving STA operating on the second link, and a third receiving STA operating on the third link.

The A-Control field includes a control identifier and control information for a Buffer Status Report (BSR). The control information for the BSR may be set based on the control identifier. A value of the control identifier may be 3. The A-Control field is composed of the control identifier and control information according to the control identifier. When the value of the control identifier is 3, the control information may be set as control information for the BSR.

The control information for the BSR includes a link identifier, an Access Category Index (ACI) bitmap subfield, a Delta Traffic Identifier (TID) subfield, an ACI High subfield, a Scaling Factor subfield, and a Queue Size High subfield.

Control information for a BSR supporting one existing link includes the ACI bitmap subfield, the Delta TID subfield, the ACI High subfield, the scaling factor subfield, the Queue Size High subfield, and the Queue Size All subfield. The ACI bitmap subfield is 4 bits, the Delta TID subfield is 2 bits, the ACI High subfield is 2 bits, the scaling factor subfield is 2 bits, the Queue Size High subfield is 8 bits, and the Queue Size All subfield is 8 bits. That is, the control information for the existing BSR consists of a total of 26 bits.

When the A-Control field defined in the 802.11ax wireless LAN system includes a control identifier and control information for BSR (supporting one link), since the control identifier is 4 bits and the control information for the existing BSR is 26 bits, it is assumed that the A-Control field must be configured within 30 bits.

However, as in this embodiment, when the link identifier is included in the control information for the BSR to configure the control information for the BSR supporting Multi-Link, since the link identifier is 4 bits, there may be a problem that the size of the A-Control field exceeds 30 bits. Accordingly, in order to include control information for the BSR supporting Multi-Link using the existing A-Control field, a format that is lighter than the control information for the existing BSR is required. This embodiment proposes a method for transmitting and receiving BSR information for another receiving STA in a receiving MLD (non-AP MLD) in one frame (the A-Control field) by omitting some subfields (Queue Size All subfields to be described later) in the control information for the existing BSR to configure the control information of the A-Control field. According to this embodiment, frame overhead can be reduced by transmitting and receiving BSR information (or control information) for several links in one frame. Even if the link of another STA is not in an awake state, it is possible to transmit BSR information of the other STA using the link of a specific STA, which is effective in terms of power saving.

According to this embodiment, the control information for the BSR may omit the Queue Size All subfield. Since the Queue Size All subfield is omitted, the control information for the BSR may include information on an amount of buffered traffic for an access category (AC) identified by the ACI High subfield. Also, the Delta TID subfield may be omitted according to a value of the ACI bitmap subfield.

As another example, a case of omitting the ACI High subfield may also be considered. Since the ACI High subfield is omitted, the control information for the BSR may include information on an amount of buffered traffic for all ACs indicated through the ACI bitmap subfield of a specific link (or buffer information in all queues for each link).

When the link identifier is an identifier for the second link, the control information for the BSR may be BSR information for the second link. When the link identifier is an identifier for the third link, the control information for the BSR may be BSR information for the third link. That is, BSR information for a link can be determined according to the link identifier.

For example, when the link identifier is an identifier for the second link, the receiving MLD (or the first receiving STA) may include the BSR information for the second link in the A-Control field and transmit it to the transmitting MLD (or the first transmitting STA). When the link identifier is an identifier for the third link, the receiving MLD (or the first receiving STA) may include the BSR information for the third link in the A-Control field and transmit it to the transmitting MLD (or the first transmitting STA).

The first receiving STA may be in an awake state or in a state in which there is traffic buffered for Uplink (UL) transmission. Alternatively, the second and third receiving STAs may be in a doze state. As described above, it is inefficient in terms of power consumption for the receiving MLD operating in power saving mode to awake all receiving STAs to transmit control information of the receiving STA through the A-Control field. According to this embodiment, the BSR information of the second or third receiving STA can be transmitted through the A-Control field without awakening the second and third receiving STAs, and it has the effect of being efficient in terms of power saving.

When a separate link identifier is included in the A-Control field, the link identifier is omitted from the control information for the BSR.

Figure 36:
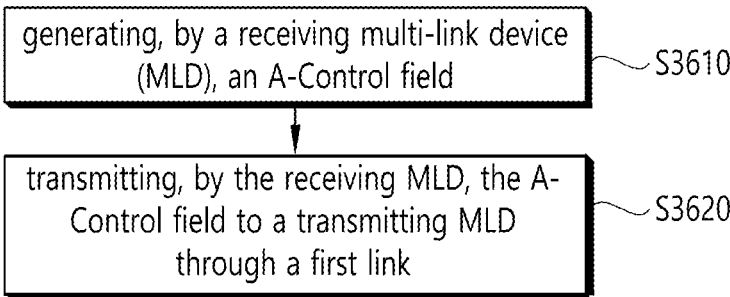
FIG. 36 is a flowchart illustrating a procedure in which a receiving MLD transmits BSR information to a transmitting MLD based on an A-Control field according to this embodiment.

FIG. 36 is a flowchart illustrating a procedure in which a receiving MLD transmits BSR information to a transmitting MLD based on an A-Control field according to this embodiment.

The example of FIG. 36 may be performed in a network environment in which a next generation WLAN system (IEEE 802.11be or EHT WLAN system) is supported. The next generation wireless LAN system is a WLAN system that is enhanced from an 802.11ax system and may, therefore, satisfy backward compatibility with the 802.11ax system.

This embodiment newly defines the existing A-Control field to support Multi-Link, and propose a method and apparatus for transmitting and receiving BSR information of another link (or other receiving STA) based on the newly defined A-Control field. Here, the transmitting MLD may correspond to the AP MLD, and the receiving MLD may correspond to the non-AP MLD.

In step S3610, a receiving multi-link device (MLD) generates an A-Control field.

In step S3620, the receiving MLD transmits the A-Control field to a transmitting MLD through a first link.

The transmitting MLD includes a first transmitting station (STA) operating on the first link, a second transmitting STA operating on a second link, and a third transmitting STA operating on a third link.

The receiving MLD includes a first receiving STA operating on the first link, a second receiving STA operating on the second link, and a third receiving STA operating on the third link.

The A-Control field includes a control identifier and control information for a Buffer Status Report (BSR). The control information for the BSR may be set based on the control identifier. A value of the control identifier may be 3. The A-Control field is composed of the control identifier and control information according to the control identifier. When the value of the control identifier is 3, the control information may be set as control information for the BSR.

The control information for the BSR includes a link identifier, an Access Category Index (ACI) bitmap subfield, a Delta Traffic Identifier (TID) subfield, an ACI High subfield, a Scaling Factor subfield, and a Queue Size High subfield.

Control information for a BSR supporting one existing link includes the ACI bitmap subfield, the Delta TID subfield, the ACI High subfield, the scaling factor subfield, the Queue Size High subfield, and the Queue Size All subfield. The ACI bitmap subfield is 4 bits, the Delta TID subfield is 2 bits, the ACI High subfield is 2 bits, the scaling factor subfield is 2 bits, the Queue Size High subfield is 8 bits, and the Queue Size All subfield is 8 bits. That is, the control information for the existing BSR consists of a total of 26 bits.

When the A-Control field defined in the 802.11ax wireless LAN system includes a control identifier and control information for BSR (supporting one link), since the control identifier is 4 bits and the control information for the existing BSR is 26 bits, it is assumed that the A-Control field must be configured within 30 bits.

However, as in this embodiment, when the link identifier is included in the control information for the BSR to configure the control information for the BSR supporting Multi-Link, since the link identifier is 4 bits, there may be a problem that the size of the A-Control field exceeds 30 bits. Accordingly, in order to include control information for the BSR supporting Multi-Link using the existing A-Control field, a format that is lighter than the control information for the existing BSR is required. This embodiment proposes a method for transmitting and receiving BSR information for another receiving STA in a receiving MLD (non-AP MLD) in one frame (the A-Control field) by omitting some subfields (Queue Size All subfields to be described later) in the control information for the existing BSR to configure the control information of the A-Control field. According to this embodiment, frame overhead can be reduced by transmitting and receiving BSR information (or control information) for several links in one frame. Even if the link of another STA is not in an awake state, it is possible to transmit BSR information of the other STA using the link of a specific STA, which is effective in terms of power saving.

According to this embodiment, the control information for the BSR may omit the Queue Size All subfield. Since the Queue Size All subfield is omitted, the control information for the BSR may include information on an amount of buffered traffic for an access category (AC) identified by the ACI High subfield. Also, the Delta TID subfield may be omitted according to a value of the ACI bitmap subfield.

As another example, a case of omitting the ACI High subfield may also be considered. Since the ACI High subfield is omitted, the control information for the BSR may include information on an amount of buffered traffic for all ACs indicated through the ACI bitmap subfield of a specific link (or buffer information in all queues for each link).

When the link identifier is an identifier for the second link, the control information for the BSR may be BSR information for the second link. When the link identifier is an identifier for the third link, the control information for the BSR may be BSR information for the third link. That is, BSR information for a link can be determined according to the link identifier.

For example, when the link identifier is an identifier for the second link, the receiving MLD (or the first receiving STA) may include the BSR information for the second link in the A-Control field and transmit it to the transmitting MLD (or the first transmitting STA). When the link identifier is an identifier for the third link, the receiving MLD (or the first receiving STA) may include the BSR information for the third link in the A-Control field and transmit it to the transmitting MLD (or the first transmitting STA).

The first receiving STA may be in an awake state or in a state in which there is traffic buffered for Uplink (UL) transmission. Alternatively, the second and third receiving STAs may be in a doze state. As described above, it is inefficient in terms of power consumption for the receiving MLD operating in power saving mode to awake all receiving STAs to transmit control information of the receiving STA through the A-Control field. According to this embodiment, the BSR information of the second or third receiving STA can be transmitted through the A-Control field without awakening the second and third receiving STAs, and it has the effect of being efficient in terms of power saving.

When a separate link identifier is included in the A-Control field, the link identifier is omitted from the control information for the BSR.

The technical features of the present disclosure may be applied to various devices and methods. For example, the technical features of the present disclosure may be performed/supported through the device(s) of FIG. 1 and/or FIG. 11. For example, the technical features of the present disclosure may be applied to only part of FIG. 1 and/or FIG. 11. For example, the technical features of the present disclosure may be implemented based on the processing chip(s) 114 and 124 of FIG. 1, or implemented based on the processor(s) 111 and 121 and the memory(s) 112 and 122, or implemented based on the processor 610 and the memory 620 of FIG. 11. For example, the device according to the present disclosure generates an A-Control field; and transmits the A-Control field to a transmitting multi-link device (MLD) through a first link.

The technical features of the present disclosure may be implemented based on a computer readable medium (CRM). For example, a CRM according to the present disclosure is at least one computer readable medium including instructions designed to be executed by at least one processor.

The CRM may store instructions that perform operations including generating an A-Control field; and transmitting the A-Control field to a transmitting multi-link device (MLD) through a first link. At least one processor may execute the instructions stored in the CRM according to the present disclosure. At least one processor related to the CRM of the present disclosure may be the processor 111, 121 of FIG. 1, the processing chip 114, 124 of FIG. 1, or the processor 610 of FIG. 11. Meanwhile, the CRM of the present disclosure may be the memory 112, 122 of FIG. 1, the memory 620 of FIG. 11, or a separate external memory/storage medium/disk.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according to uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed by a non-access point (non-AP) multi-link device (MLD) in a wireless local area network (WLAN) system, the method comprising:

generating, by a first non-AP station (STA) affiliated with the non-AP MLD, an Aggregated Control (A-Control) field; and transmitting, by the first non-AP STA, the A-Control field to a first AP affiliated with an AP MLD, wherein the AP MLD includes the first AP operating on a first link, a second AP operating on a second link, and a third AP operating on a third link, wherein the non-AP MLD includes the first non-AP STA operating on the first link, a second non-AP STA operating on the second link, and a third non-AP STA operating on the third link, wherein the A-Control field is defined based on control information for a Buffer Status Report (BSR) for the second and the third links, and wherein the control information for the BSR includes a link identifier, an Access Category Index (ACI) bitmap subfield, a Delta Traffic Identifier (TID) subfield, an ACI High subfield, a Scaling Factor subfield, and a Queue Size High subfield.

2. The method of claim 1, wherein the A-Control field further includes a control identifier, wherein the control information for the BSR is set based on the control identifier, wherein a value of the control identifier is 3.

3. The method of claim 1, wherein based on the link identifier being an identifier for the second link, the control information for the BSR is BSR information for the second link, wherein based on the link identifier being an identifier for the third link, the control information for the BSR is BSR information for the third link.

4. The method of claim 1, wherein the first non-AP STA is in an awake state or in a state in which there is traffic buffered for Uplink (UL) transmission.

5. The method of claim 1, wherein a Queue Size All subfield is omitted in the control information for the BSR, wherein the control information for the BSR includes information on an amount of buffered traffic for an access category (AC) identified by the ACI High subfield.

6. The method of claim 1, wherein based on a separate link identifier being included in the A-Control field, the link identifier is omitted from the control information for the BSR.

7. The method of claim 2, wherein the control identifier is 4 bits, wherein the link identifier is 4 bits, wherein the ACI bitmap subfield is 4 bits, wherein the Delta TID subfield is 2 bits, wherein the ACI High subfield is 2 bits, wherein the scaling factor subfield is 2 bits, wherein the Queue Size High subfield is 8 bits.

8. A non-access point (non-AP) multi-link device (MLD) in a wireless local area network (WLAN) system, the non-AP MLD comprising:

a memory;

a transceiver; and a processor operatively coupled to the memory and the transceiver, wherein the processor is configured to:

generate, by a first non-AP station (STA) affiliated with the non-AP MLD, an Aggregated Control (A-Control) field; and transmit, by the first non-AP STA, the A-Control field to a first AP affiliated with an AP MLD, wherein the AP MLD includes the first AP operating on a first link, a second AP operating on a second link, and a third AP operating on a third link, wherein the non-AP MLD includes the first non-AP STA operating on the first link, a second non-AP STA operating on the second link, and a third non-AP STA operating on the third link, wherein the A-Control field is defined based on control information for a Buffer Status Report (BSR) for the second and the third links, and wherein the control information for the BSR includes a link identifier, an Access Category Index (ACI) bitmap subfield, a Delta Traffic Identifier (TID) subfield, an ACI High subfield, a Scaling Factor subfield, and a Queue Size High subfield.

9. A method performed by an access point (AP) multi-link device (MLD) in a wireless local area network (WLAN) system, the method comprising:

receiving, by a first AP affiliated with the AP MLD, an Aggregated Control (A-Control) field from a first non-AP station (STA) affiliated with a non-AP MLD; and decoding, by the first AP, the A-Control field, wherein the AP MLD includes the first AP operating on a first link, a second AP operating on a second link, and a third AP operating on a third link, wherein the non-AP MLD includes the first non-AP STA operating on the first link, a second non-AP STA operating on the second link, and a third non-AP STA operating on the third link, wherein the A-Control field is defined based on control information for a Buffer Status Report (BSR) for the second and the third links, and wherein the control information for the BSR includes a link identifier, an Access Category Index (ACI) bitmap subfield, a Delta Traffic Identifier (TID) subfield, an ACI High subfield, a Scaling Factor subfield, and a Queue Size High subfield.

10. The method of claim 9, wherein the A-Control field further includes a control identifier, wherein the control information for the BSR is set based on the control identifier, wherein a value of the control identifier is 3.

11. The method of claim 9, wherein based on the link identifier being an identifier for the second link, the control information for the BSR is BSR information for the second link, wherein based on the link identifier being an identifier for the third link, the control information for the BSR is BSR information for the third link.

12. The method of claim 9, wherein the first non-AP STA is in an awake state or in a state in which there is traffic buffered for Uplink (UL) transmission.

13. The method of claim 9, wherein a Queue Size All subfield is omitted in the control information for the BSR, wherein the control information for the BSR includes information on an amount of buffered traffic for an access category (AC) identified by the ACI High subfield.

14. The method of claim 9, wherein based on a separate link identifier being included in the A-Control field, the link identifier is omitted from the control information for the BSR.

15. The method of claim 10, wherein the control identifier is 4 bits, wherein the link identifier is 4 bits, wherein the ACI bitmap subfield is 4 bits, wherein the Delta TID subfield is 2 bits, wherein the ACI High subfield is 2 bits, wherein the scaling factor subfield is 2 bits, wherein the Queue Size High subfield is 8 bits.

* * * * *